(12) United States Patent
Schalkwijk et al.

(10) Patent No.: US 11,106,730 B2
(45) Date of Patent: Aug. 31, 2021

(54) AUDIO MATCHING

(71) Applicant: Intrasonics S.à.r.l, Luxembourg (LU)

(72) Inventors: Jerome Schalkwijk, Harston (GB);
Peter John Kelly, Harston (GB)

(73) Assignee: Intrasonics S.à.r.l, Luxembourg (LU)

( * ) Notice: Subject to any disclaimer, the term of this patent is extended or adjusted under 35 U.S.C. 154(b) by 241 days.

(21) Appl. No.: 16/325,692

(22) PCT Filed: Jul. 28, 2017

(86) PCT No.: PCT/GB2017/052219
§ 371 (c)(1),
(2) Date: Feb. 14, 2019

(87) PCT Pub. No.: WO2018/033696
PCT Pub. Date: Feb. 22, 2018

(65) Prior Publication Data
US 2019/0213214 A1   Jul. 11, 2019

(30) Foreign Application Priority Data

Aug. 15, 2016 (GB) ..................... 1613960

(51) Int. Cl.
*G06F 16/683* (2019.01)
*G10L 25/54* (2013.01)
(Continued)

(52) U.S. Cl.
CPC .......... *G06F 16/683* (2019.01); *G06F 16/632* (2019.01); *G06F 16/635* (2019.01);
(Continued)

(58) Field of Classification Search
CPC .... G06F 16/683; G06F 16/638; G06F 16/635; G06F 16/632; G10L 25/54; G10L 25/51; G10L 19/018
See application file for complete search history.

(56) References Cited

U.S. PATENT DOCUMENTS

| 8,681,950 | B2 * | 3/2014 | Vlack | ................... G06F 16/683 |
| | | | | 379/88.01 |
| 2007/0124756 | A1 * | 5/2007 | Covell | ............... H04N 21/8106 |
| | | | | 725/18 |

(Continued)

FOREIGN PATENT DOCUMENTS

| EP | 21323046 A1 | 5/2011 |
| WO | 02/45273 A2 | 6/2002 |

(Continued)

OTHER PUBLICATIONS

Haitsma, J. et al.,"A Highly Robust Audio Fingerprinting System with an Efficient Search Strategy", Journal of New Music Research: 211-221 (2003).

(Continued)

*Primary Examiner* — Cam Y T Truong
(74) *Attorney, Agent, or Firm* — Merchant & Gould P.C.

(57) ABSTRACT

An audio matching technique generates audio fingerprints from a captured audio signal. Coarse and Fine fingerprints are generated from the captured audio. The coarse fingerprint is used to match with a set of coarse fingerprints stored in a database to identify a subset of possibly matching database entries. The fine fingerprint is then used to perform a detailed comparison with fine fingerprints associated with the subset of possibly matching database entries in order to find a match for the captured audio signal.

6 Claims, 19 Drawing Sheets

(51) Int. Cl.
*G06F 16/638* (2019.01)
*G06F 16/635* (2019.01)
*G06F 16/632* (2019.01)
*G10L 25/51* (2013.01)

(52) U.S. Cl.
CPC ............ *G06F 16/638* (2019.01); *G10L 25/51* (2013.01); *G10L 25/54* (2013.01)

(56) References Cited

U.S. PATENT DOCUMENTS

| 2015/0199974 A1* | 7/2015 | Bilobrov, I ............. G10L 25/51 |
| | | 700/94 |
| 2015/0254338 A1 | 9/2015 | Cheluvaraja et al. |
| 2015/0255075 A1* | 9/2015 | Cheluvaraja .......... G10L 15/142 |
| | | 704/219 |

FOREIGN PATENT DOCUMENTS

| WO | 2008/145994 A1 | 12/2008 |
| WO | 2009/107049 A2 | 9/2009 |
| WO | 2009/144470 A1 | 12/2009 |

OTHER PUBLICATIONS

International Search Report and Written Opinion for PCT/GB2017/052219, dated Jan. 15, 2018.
Search Report for British Patent Application No. 1613960.2, dated Feb. 20, 2017.

* cited by examiner

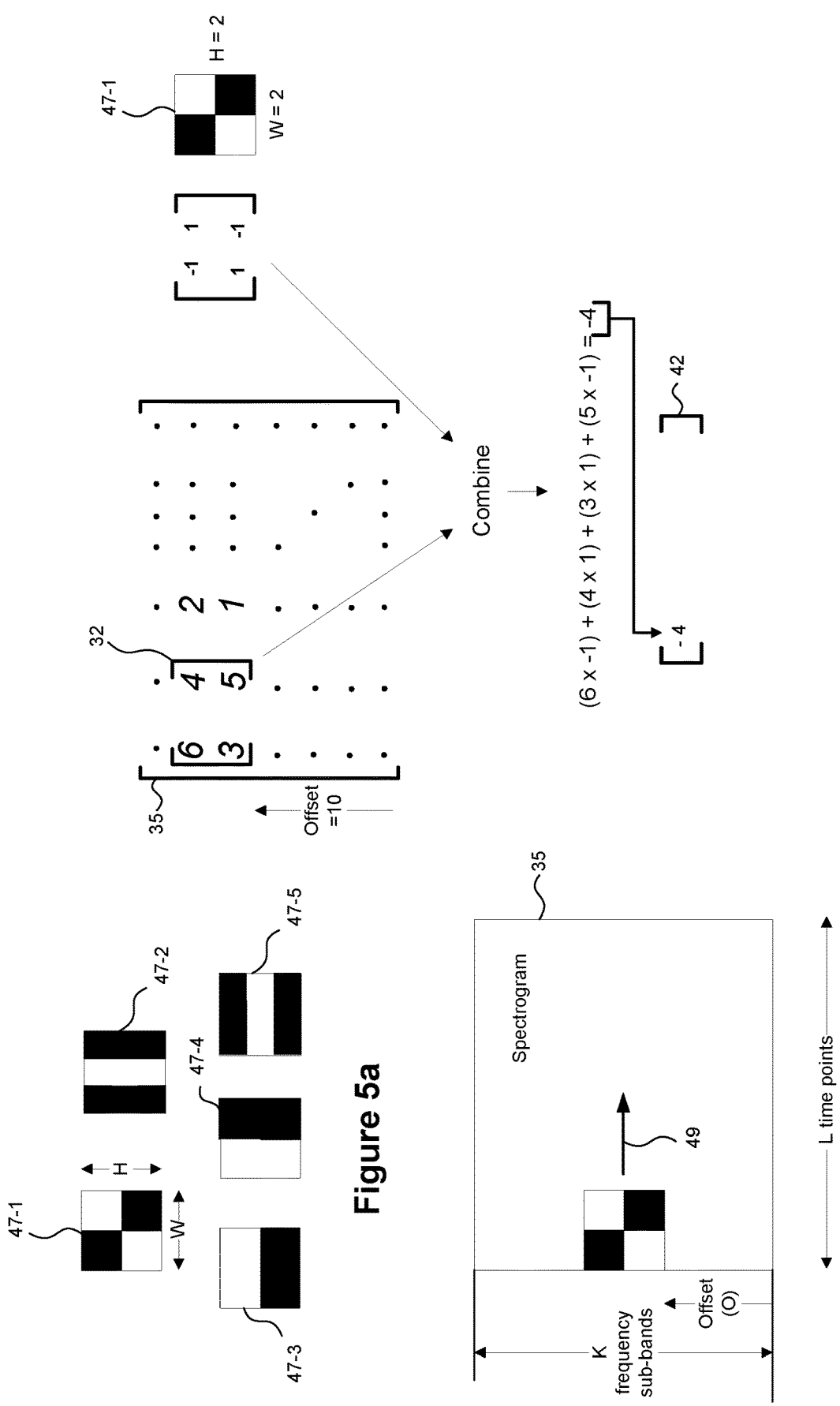

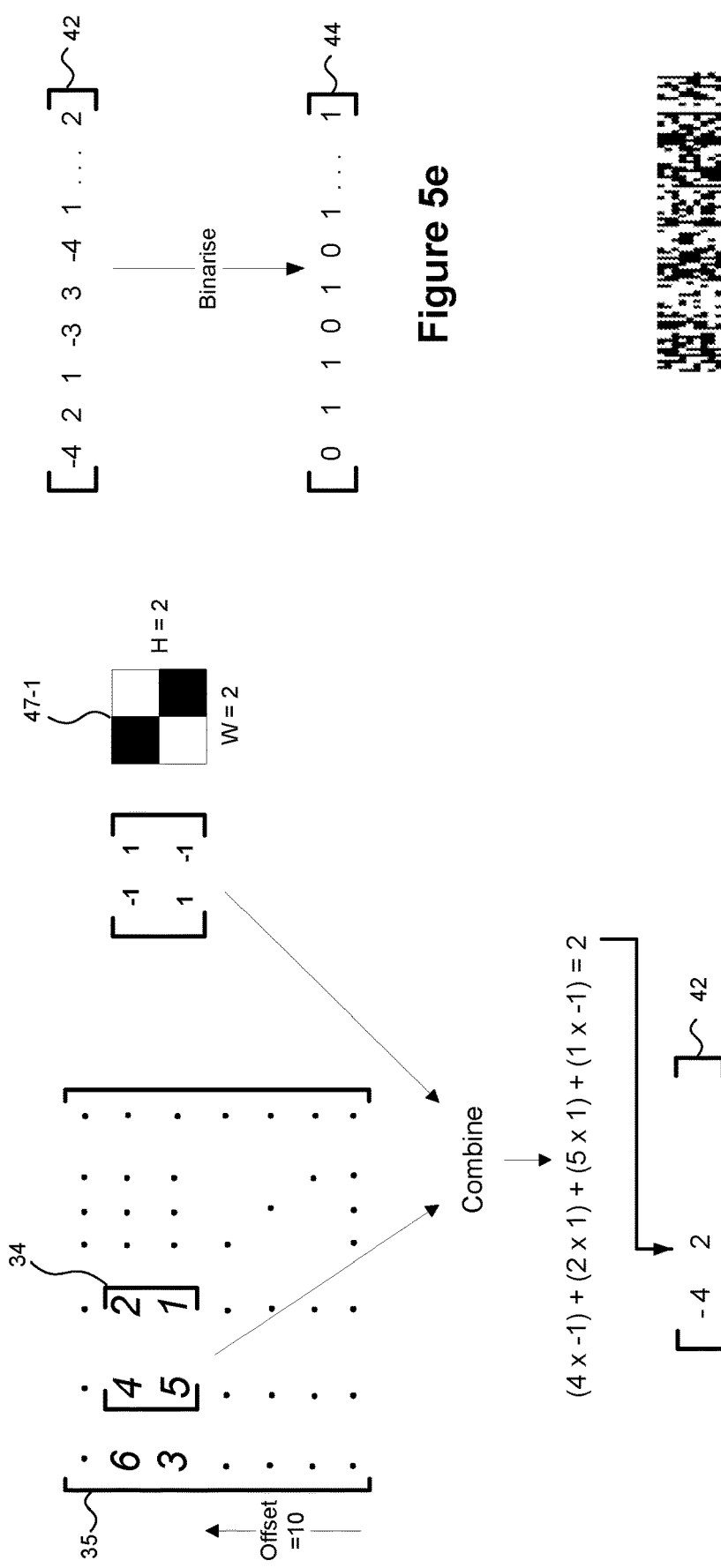
Figure 5f
Figure 5e
Figure 5d

AUDIO MATCHING

This application is a National Stage Application of PCT/GB2017/052219, filed 28 Jul. 2017, which claims benefit of British Patent Application No. 1613960.2, filed 15 Aug. 2016, and which applications are incorporated herein by reference. To the extent appropriate, a claim of priority is made to each of the above-disclosed applications.

The present invention relates to methods and apparatus for audio matching. The invention has particular, but not exclusive relevance to audio matching systems in which a portable user device, such as a computer tablet or a cellular telephone, can capture sounds which can then be identified by a matching process.

BACKGROUND OF THE INVENTION

There are a number of known audio recognition techniques including:
  active audio recognition in which watermarks are encoded within an audio signal which can be extracted later in order to identify the audio signal,
  passive audio recognition in which an audio signal is sampled and the sampled audio is used to identify the audio from a database of audio samples, and
  hybrid audio recognition which combines the active and passive techniques.

The applicant has proposed a number of different active audio recognition techniques and these are described in, for example, WO2008/145994, WO2009/144470 and WO02/45273. All these techniques rely on steganographically hiding data within the audio to be recognised which is later recovered by a user device. These systems work well especially when the audio is picked up via a microphone rather than being obtained electrically directly over a broadcast channel. As discussed in these earlier patent applications, there are a number of uses for these systems including audience surveying and user interaction with broadcast media. However, to work, access to the broadcast media must be provided prior to (or during) the broadcast to allow the hiding of the watermarks in the audio. This is not always possible.

SUMMARY OF THE INVENTION

Passive audio recognition techniques do not require the hiding of a watermark—so in theory can be used to recognise any audio sample. However, passive audio recognition techniques have the disadvantage that they require a more demanding comparison between sampled audio and a large database of audio samples. Further, when the audio is captured by the microphone of a user's device, the captured audio is likely to be relatively noisy compared to the original audio and this can easily lead to errors in the recognition results. One common technique used to passively match audio is to create an acoustic 'fingerprint' of the captured sound and then to compare this fingerprint with corresponding fingerprints of audio signals in the database. The fingerprint tries to capture the important acoustic features of the audio signal which helps to reduce the burden of matching the audio sample with the audio in the database. However, these fingerprint recognition systems still require significant processing to be able to compare the query fingerprint with the fingerprints in the database—and this processing burden continues to grow as more and more media content is created. Techniques are required to reduce this processing burden. In developing their fingerprint based audio recognition system, the inventors also devised a technique for generating audio fingerprints that are robust to noise and other interference and that make it easier to distinguish between fingerprints of different audio samples.

According to one aspect, the present invention provides an audio matching system comprising: means (which may be a microphone, an antenna or a central processing unit) for capturing an audio signal; means (which may be a hardware circuit or a software module being run by one or more central processing units) for processing the captured audio signal to generate a fine query acoustic fingerprint representative of the captured audio signal; means (which may be a hardware circuit or a software module being run by one or more central processing units) for generating a coarse query acoustic fingerprint representative of the captured audio signal; an audio database comprising a plurality of database entries, each entry being associated with audio content, and each entry comprising: i) a fine database acoustic fingerprint representative of the associated audio content; and ii) information relating to the associated audio content; means (which may be a hardware circuit or a software module being run by one or more central processing units) for matching the coarse query acoustic fingerprint with coarse database acoustic fingerprints associated with said plurality of database entries to identify a subset of possibly matching database entries; means (which may be a hardware circuit or a software module being run by one or more central processing units) for matching the fine query acoustic fingerprint with the fine database acoustic fingerprints of the database entries in said subset of possibly matching database entries to identify a matching database entry; and means (which may be a hardware circuit or a software module being run by one or more central processing units) for outputting a matching response comprising said information of the identified matching database entry. In this way an initial matching is done using coarse fingerprints to identify one or more possible matches and then a more detailed match is performed using the fine query fingerprint and a subset of the fine database fingerprints. The inventors have found that this approach significantly speeds up the matching process. Further, as the coarse fingerprints can be generated from the fine fingerprints, there is no need to store additional data or to transmit additional data between different devices or between different software components.

Each database entry may comprise the associated coarse database acoustic fingerprint or the system may further comprise means (which may be a hardware circuit or a software module being run by one or more central processing units) for generating the coarse database acoustic fingerprint associated with a database entry.

In some embodiments, the means for generating the coarse query acoustic fingerprint is configured to generate the coarse query acoustic fingerprint from the fine query acoustic fingerprint. This is similarly true for embodiments, in which the coarse database acoustic fingerprint is generated from the associated fine acoustic fingerprint. The coarse query or database acoustic fingerprint may be generated by applying a set of filters to the fine query or database acoustic fingerprint. Typically, the fine query acoustic fingerprint comprises an array of values and the coarse query or database acoustic fingerprint is generated by applying a filter from the set of filters to a portion of the array of values to generate a value of the coarse query or database acoustic fingerprint. Each filter normally comprises a plurality of filter coefficients and the coarse query or database acoustic fingerprint is generated by applying the filter to the portion by weighting each value of the portion with a respective filter coefficient and by combining the weighted values. Each filter may be applied to a plurality of portions of the array to generate a corresponding plurality of values of the coarse query or database fingerprint. A row or column of the coarse query or database acoustic fingerprint may be generated in response to applying each filter to the fine query acoustic fingerprint.

Normally, the fine acoustic fingerprints have a greater bit rate than the coarse acoustic fingerprints.

The audio matching system may further comprise means (which may be a hardware circuit or a software module being run by one or more central processing units) for generating a spectrogram of the captured audio signal and wherein the means for generating the fine query acoustic fingerprint may generate the fine acoustic fingerprint from the spectrogram. The spectrogram may be generated in numerous ways including performing a frequency transform such as a Fast Fourier Transform (FFT) or a Discrete Fourier Transform (DFT) or by taking a wavelet transform of the captured audio signal.

In some embodiments, the means for generating the fine query acoustic fingerprint is configured to apply a set of filters to the spectrogram to generate the fine query fingerprint. The means for generating the fine query acoustic fingerprint may apply a set of filters to the spectrogram that is different to the set of filters applied by the means for generating the coarse query acoustic fingerprint. The means for generating the fine query acoustic fingerprint may apply a filter from the set of filters to a portion of the spectrogram to generate a value of the fine query acoustic fingerprint. Each filter typically comprises a plurality of filter coefficients and the means for generating the fine query acoustic fingerprint applies the filter to the portion of the spectrogram by weighting each value of the portion with a respective filter coefficient and by combining the weighted values to generate the value of the fine query acoustic fingerprint. Each filter from the set of filters is typically applied to a plurality of portions of the spectrogram to generate a corresponding plurality of values of the fine query acoustic fingerprint. A row or column of the fine query acoustic fingerprint may be generated in response to applying each filter to the spectrogram. In some embodiments, the means for generating the fine query acoustic fingerprint is configured to order the rows or columns of the fine query acoustic fingerprint that are generated by applying the set of filters to the spectrogram so that similar rows or columns are adjacent to each other. For example, the means for generating the fine query acoustic fingerprint may order the rows or columns of the fine query acoustic fingerprint in order to increase coherence between neighbouring rows or columns of the fine query acoustic fingerprint. Each filter may have an associated offset that defines portions of the spectrogram or portions of the fine query acoustic fingerprint to which the filter is applied.

The present invention also provides an audio matching method performed by one or more processors, the method comprising: capturing an audio signal; processing the captured audio signal to generate a fine query acoustic fingerprint representative of the captured audio signal; generating a coarse query acoustic fingerprint representative of the captured audio signal; matching the coarse query acoustic fingerprint with coarse database acoustic fingerprints of a plurality of database entries to identify a subset of possibly matching database entries; matching the fine query acoustic fingerprint with fine database acoustic fingerprints of the database entries in said subset of possibly matching database entries to identify a matching database entry; and outputting a matching response comprising information relating to the identified matching database entry.

The present invention also provides an audio matching system comprising: an audio database comprising a plurality of database entries, each entry being associated with audio content, and each entry: i) comprising a first database acoustic fingerprint representative of the associated audio content and having a first bit rate; ii) having an associated second database acoustic fingerprint representative of the associated audio content and having a second bit rate that is lower than the first bit rate; and iii) comprising information relating to the associated audio content; and one or more processors (which may be central processing units) configured to: capture an audio signal; process the captured audio signal to generate a first query acoustic fingerprint representative of the captured audio signal and having said first bit rate; generate a second query acoustic fingerprint representative of the captured audio signal and having said second bit rate; match the second query acoustic fingerprint with the second database acoustic fingerprints associated with said plurality of database entries to identify a subset of possibly matching database entries; match the first query acoustic fingerprint with the first database acoustic fingerprints of the database entries in said subset of possibly matching database entries to identify a matching database entry; and output a matching response comprising said information of the identified matching database entry. Each database entry may comprise the associated second database acoustic fingerprint or the one or more processors may be configured to generate the second database acoustic fingerprint associated with a database entry either from a spectrogram of the associated audio signal or from the first database acoustic fingerprint associated with that database entry.

The present invention also provides an audio matching system comprising: a user device, an audio matching server and an audio database comprising a plurality of database entries, each entry being associated with audio content, and each entry: i) comprising a first database acoustic fingerprint representative of the associated audio content and having a first bit rate; ii) having an associated second database acoustic fingerprint representative of the associated audio content and having a second bit rate that is lower than the first bit rate; and iii) comprising information relating to the associated audio content; wherein the user device has one or more processors (which may be central processing units) configured to: capture an audio signal; process the captured audio signal to generate a first query acoustic fingerprint representative of the captured audio signal and having said first bit rate; wherein the audio matching server has one or more processors (which may be central processing units); wherein the one or more processors of the user device or the one or more processors of the audio matching server is configured to generate a second query acoustic fingerprint representative of the captured audio signal and having said second bit rate; wherein the one or more processors of the audio matching server is configured to: match the second query acoustic fingerprint with the second database acoustic fingerprints associated with said plurality of database entries to identify a subset of possibly matching database entries; match the first query acoustic fingerprint with the first database acoustic fingerprints of the database entries in said subset of possibly matching database entries to identify a matching database entry; and outputting a matching response comprising said information of the identified matching database entry.

The present invention also provides a user device for use in an audio matching system, the user device comprising: means (which may be a hardware circuit or a software module being run by one or more central processing units) for capturing an audio signal; means (which may be a hardware circuit or a software module being run by one or more central processing units) for processing the captured audio signal to generate a fine query acoustic fingerprint representative of the captured audio signal; means (which may be a hardware circuit or a software module being run by one or more central processing units) for generating a coarse query acoustic fingerprint representative of the captured audio signal; means (which may be a hardware circuit or a software module being run by one or more central processing units) for outputting the coarse query acoustic fingerprint and the fine query acoustic fingerprint to an audio matching server; and means (which may be a hardware circuit or a software module being run by one or more central processing units) for receiving a matching response comprising information relating to the captured audio.

The present invention also provides an audio matching server for use in an audio matching system, the audio matching server comprising: means (which may be a hardware circuit or a software module being run by one or more central processing units) for receiving a fine query acoustic fingerprint representative of a captured audio signal; means (which may be a hardware circuit or a software module being run by one or more central processing units) for receiving or generating a coarse query acoustic fingerprint representative of the captured audio signal; means (which may be a hardware circuit or a software module being run by one or more central processing units) for matching the coarse query acoustic fingerprint with coarse database acoustic fingerprints associated with a plurality of database entries to identify a subset of possibly matching database entries; means (which may be a hardware circuit or a software module being run by one or more central processing units) for matching the fine query acoustic fingerprint with fine database acoustic fingerprints of the database entries in said subset of possibly matching database entries to identify a matching database entry; and means (which may be a hardware circuit or a software module being run by one or more central processing units) for outputting a matching response comprising information relating to the captured audio.

The present invention also provides a method of identifying an optimised set of filters for use in generating an acoustic fingerprint, the method comprising: i) providing one or more databases comprising a plurality of audio samples including $N_M$ matched pairs of audio samples and $N_N$ non-matched pairs of audio samples, each matched pair of audio samples comprising an original audio sample and a distorted version of a same original audio signal and each non-matched pair of audio samples comprising an original audio sample and a version of a different original audio signal; ii) determining a spectrogram for each audio sample in the one or more databases; iii) applying each of $N_f$ candidate filters to each spectrogram and binarising a result to generate a plurality of vectors of binary bits, each vector of binary bits being associated with one candidate filter and one audio sample; iv) comparing bits in the vectors associated with a selected matched pair of audio samples for a current filter to determine bit error rate information for the current filter and the selected matched pair of audio samples; v) repeating step iv) for each matched pair of audio samples to determine matching mean and variance information for the bit error rate information determined in step iv) for the current filter; vi) comparing bits in the vectors associated with a selected non-matched pair of audio samples for the current filter to determine bit error rate information for the current filter and the selected non-matched pair of audio samples; vii) repeating step vi) for each non-matched pair of audio samples to determine non-matching mean and variance information for the bit error rate information determined in step vi) for the current filter; viii) repeating steps iv) to vii) for each candidate filter to determine matching and non-matching mean and variance information for each candidate filter; and ix) determining a subset of said candidate filters as said optimised set of filters for use in generating an acoustic fingerprint using the determined matching and non-matching mean and variance information for each candidate filter.

Determining the optimised set of filters may use the determined matching and non-matching mean and variance information for each candidate filter to minimise the chance of false positives or to minimise the chance of false negatives or some combination of both.

The method may further comprise determining covariance information for each of a plurality of pairs of filters using the determined mean and variance information; and wherein said determining said optimised set of filters for use in generating an acoustic fingerprint uses the determined matching and non-matching mean and variance information and the covariance information. In some embodiments, determining the optimised set of filters includes using a dynamic programming optimisation technique to identify the optimised set of filters.

The present invention also provides an apparatus for identifying an optimised set of filters for use in generating an acoustic fingerprint, the apparatus comprising: one or more databases comprising a plurality of audio samples including $N_M$ matched pairs of audio samples and $N_N$ non-matched pairs of audio samples, each matched pair of audio samples comprising an original audio sample and a distorted version of a same original audio signal and each non-matched pair of audio samples comprising an original audio sample and a version of a different original audio signal; and one or more processors (which may be central processing units) configured to: i) determine a spectrogram for each audio sample in the one or more databases; ii) apply each of $N_f$ candidate filters to each spectrogram and binarising a result to generate a plurality of vectors of binary bits, each vector of binary bits being associated with one candidate filter and one audio sample; iii) compare bits in the vectors associated with a selected matched pair of audio samples for a current filter to determine bit error rate information for the current filter and the selected matched pair of audio samples; iv) repeat iii) for each matched pair of audio samples to determine matching mean and variance information for the bit error rate information determined in step iii) for the current filter; v) compare bits in the vectors associated with a selected non-matched pair of audio samples for the current filter to determine bit error rate information for the current filter and the selected non-matched pair of audio samples; vi) repeat v) for each non-matched pair of audio samples to determine non-matching mean and variance information for the bit error rate information determined in v) for the current filter; vii) repeat iii) to vi) for each candidate filter to determine matching and non-matching mean and variance information for each candidate filter; and viii) determine a subset of said candidate filters as said optimised set of filters for use in generating an acoustic fingerprint using the determined matching and non-matching mean and variance information for each candidate filter.

The invention also provides a user device for use in an audio matching system, the user device comprising: means (which may be a hardware circuit or a software module being run by one or more central processing units) for capturing an audio signal; means (which may be a hardware circuit or a software module being run by one or more central processing units) for processing the captured audio signal to generate a query acoustic fingerprint representative of the captured audio signal using a set of optimised filters determined using the above described methods; means (which may be a hardware circuit or a software module being run by one or more central processing units) for outputting the query acoustic fingerprint to an audio matching server; and means (which may be a hardware circuit or a software module being run by one or more central processing units) for receiving a matching response comprising information relating to the captured audio.

The invention also provides a computer program product comprising computer implementable instructions for causing a programmable computer device to perform all the method steps discussed above or to become configured as the above described apparatus.

These and other aspects of the invention will become apparent from the following detailed description of exemplary embodiments which are described with reference to the accompanying drawings, in which:

FIG. 1 is a block diagram illustrating the main components of an audio matching system;

FIG. 2 is a block diagram illustrating the main components of a cellular telephone forming part of the audio matching system of FIG. 1;

FIG. 3 is a functional block diagram illustrating the main functional components of application software run on the cellular telephone shown in FIG. 2;

FIG. 4 illustrates the operation of a frequency analysis unit that forms part of the application software shown in FIG. 3 and illustrating the way in which a captured audio signal is divided into successive frames that are frequency analysed to generate a spectrogram of the audio signal;

FIG. 5a illustrates a number of basic filters that are used by a fingerprint generation unit to generate a fingerprint from the spectrogram;

FIG. 5b illustrates the spectrogram generated by the frequency analysis unit and the way in which a filter is applied to the spectrogram;

FIGS. 5c and 5d illustrate the way in which a filter is applied to the spectrogram by the fingerprint generation unit to generate a vector of combined values obtained by combining selected values from the spectrogram with coefficients of the filter;

FIG. 5e illustrates the way in which the vector of combined values is binarised by the fingerprint generation unit when generating the fingerprint;

FIG. 5f graphically illustrates the fingerprint generated by the fingerprint generation unit by applying a first set of filters to the spectrogram and by concatenating the resulting binary vectors to form a 2d acoustic fingerprint;

FIG. 6 illustrates a conventional fingerprint and a fingerprint generated by the cellular telephone of FIG. 1 by concatenating the binary vectors in a specific order to maximise the likelihood of adjacent binary vectors in the fingerprint being similar to each other;

FIG. 7 is a block diagram illustrating the main components of the audio matching server 5 forming part of the system shown in FIG. 1;

FIGS. 8a, 8b, 8c and 8d illustrate the way in which a coarse fingerprint generation unit forming part of the server shown in FIG. 7 generates a coarse query fingerprint from the fine query fingerprint generated by the cellular telephone;

FIG. 9 illustrates the information contained in entries within a database forming part of the audio matching system shown in FIG. 1;

FIG. 10a illustrates the way in which a coarse fingerprint matching unit forming part of the server shown in FIG. 7 matches the coarse query fingerprint with coarse fingerprints stored within the database illustrated in FIG. 9 to identify a subset of database entries that may match with the coarse query fingerprint;

FIG. 10b illustrates a result obtained by the coarse fingerprint matching unit when there is no match between the coarse query fingerprint and a coarse database fingerprint;

FIG. 10c illustrates a result obtained by the coarse fingerprint matching unit when there is a match between the coarse query fingerprint and a coarse database fingerprint;

FIG. 11 illustrates the way in which a fine fingerprint matching unit forming part of the server shown in FIG. 7 matches the fine query fingerprint with fine fingerprints stored within the database for the subset of database entries identified by the coarse fingerprint matching unit to identify the database entry that is the best match to the fine query fingerprint;

FIGS. 12a and 12b illustrate part of a training process used to determine a first set of optimised filters that are used to generate a fine fingerprint from a spectrogram;

FIG. 13a illustrates separated distributions obtained for a filter for matching pairs of training audio samples and for non-matching pairs of training audio samples;

FIG. 13b illustrates overlapping distributions obtained for a filter for matching pairs of training audio samples and for non-matching pairs of training audio samples;

FIG. 14 illustrates a trellis of nodes and a path propagation process to identify a best path through the trellis; and FIGS. 15a and 15b illustrate part of a training process used to determine a second set of optimised filters that are used to generate a coarse fingerprint from a fine fingerprint.

BRIEF DESCRIPTION OF THE DRAWINGS

Overview

A more detailed description will now be given of the main parts of the above described audio matching system.

User Cellular Telephone

Figure 1:
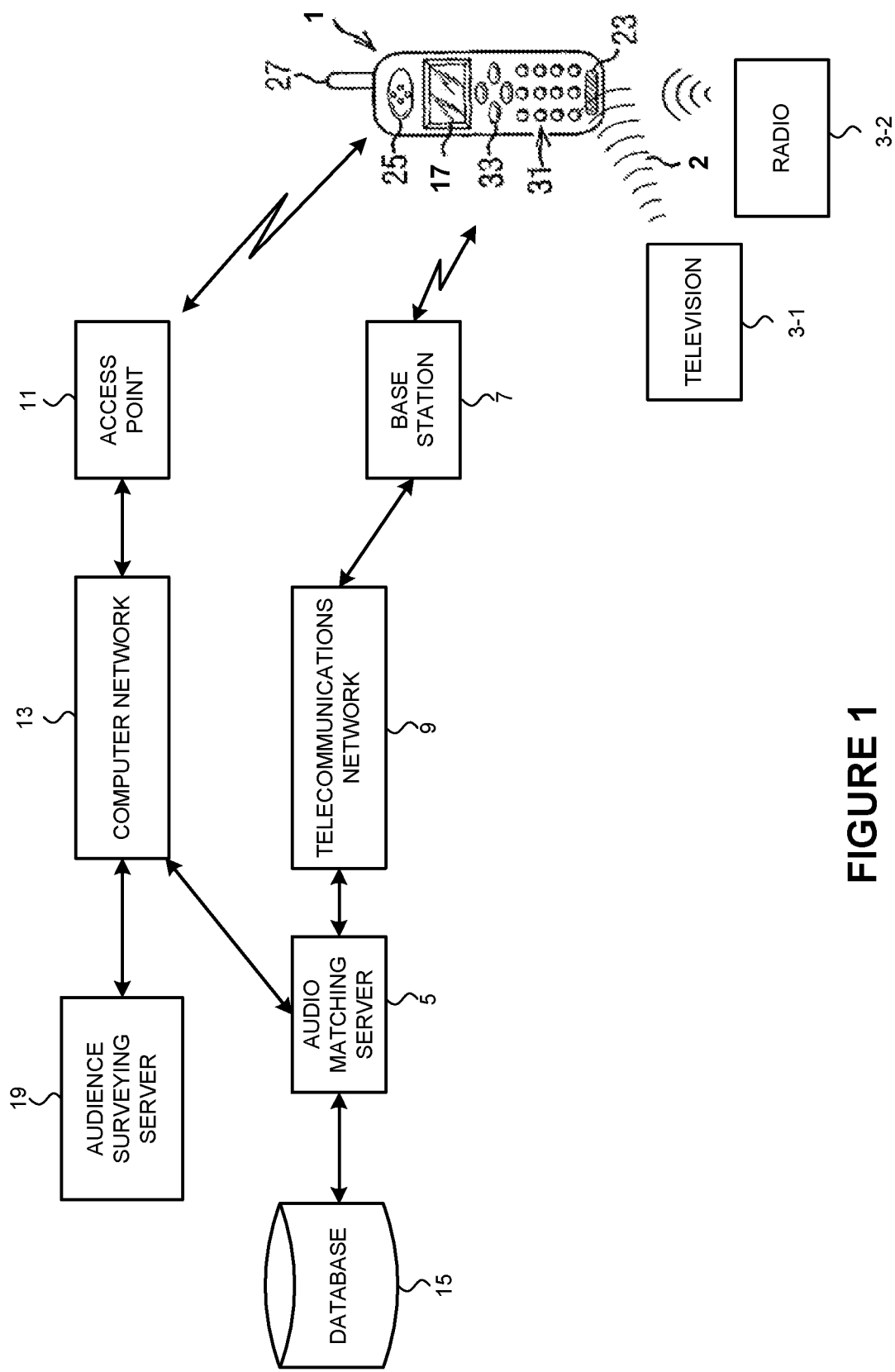
FIG. 1 is a block diagram illustrating the main components of an audio matching system embodying the present invention. The system relies on a user having a user device 1 (in this case a cellular telephone) that can capture sound 2 generated by a sound source 3 (such as a television 3-1, a radio 3-2, or a live performance etc.). The user device 1 processes the captured sound 2 and generates an acoustic fingerprint that represents the captured sound. In the following description these acoustic fingerprints will simply be referred to as fingerprints for ease of explanation. The way in which the fingerprint is generated will be described in more detail later. The user device 1 then transmits the generated fingerprint as a query to a remote audio matching server 5 either via the base station 7 and telecommunications network 9 or via an access point 11 and computer network 13 (e.g. the internet). In this embodiment, in response to receiving the query fingerprint, the audio matching server 5 processes the query fingerprint to generate a coarse query fingerprint which the server then uses to search for possibly matching entries within the database 15. The coarse fingerprint has a lower resolution or bit rate compared with the received query fingerprint. This first search using the coarse query fingerprint will identify a subset of possibly matching entries within the database 15. The audio matching server 5 then compares the higher resolution (or "fine") query fingerprint received from the user device 1 with the subset of entries identified by the first search to identify the database entry that is most similar to the fine query fingerprint. The audio matching server 5 then outputs information retrieved from the matching entry in the database 15, to the user device 1. Various different information may be returned, such as identification information of the audio captured by the user device 1; artist information; related content (such as other content from the same artist); and even computer links to content stored on other servers connected to the computer network 13. The user device 1 then outputs the returned information to the user, for example via the display 17 of the user device. An example is where the audio matching process identifies the advertisement or TV programme a viewer is watching and then presents relevant content to the user. The information retrieved from the database 15 may be provided to a third party instead of or in addition to the user device 1. This may be useful in audience surveying applications, where the purpose of the audio matching process is to identify the television or radio programme that the user is listening to or watching; which information is then sent to a third party audience surveying server 19 via the computer network 13.
Figure 2:
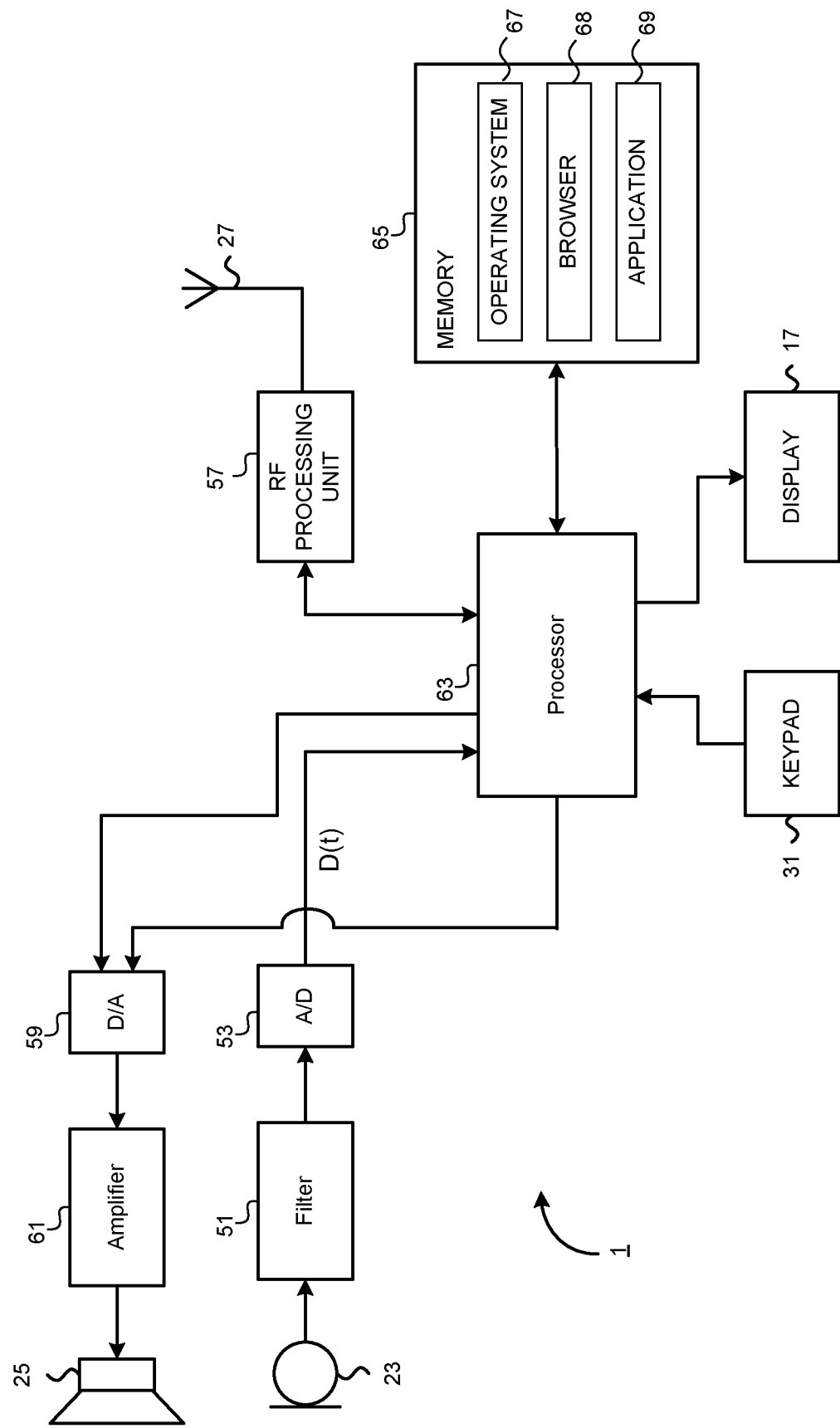

FIG. 2 is a block diagram illustrating the main components of the user's cellular telephone 1 used in this embodiment. As shown, the cellular telephone 1 includes a microphone 23 for receiving the acoustic signals 2 (such as the sound output by the television 3-1 or the radio 3-2) and for converting these acoustic signals into electrical equivalent signals. The electrical signals from the microphone 23 are then filtered by the filter 51 to remove unwanted frequencies typically those outside the frequency band of 200 Hz to 20 kHz. The filtered audio is then digitised by an analogue to digital converter 53, which samples the filtered audio typically at a sampling frequency of 24 or 48 kHz and represents each sample by a 16 bit digital value. The stream of digitised audio (D(t)) is then input to a processor 63 (which may comprise one or more central processing units).

When making a voice call, the processor 63 compresses the received audio and then passes it to an RF processing unit 57 which modulates the compressed audio data onto one or more RF carrier signals for transmission to the base station 7 via the antenna 27. Similarly, compressed audio signals received via the antenna 27 are fed to the RF processing unit 57, which demodulates the received RF signals to recover the compressed audio data from the RF carrier signal(s), which is then passed to the processor 63 for decompression. The regenerated audio samples are then output to the loudspeaker 25 via the digital to analogue converter 59 and the amplifier 61.

As shown in FIG. 2, the processor 63 is controlled by software stored in memory 65. The software includes operating system software 67 (for controlling the general operation of the cellular telephone 1), a browser 68 for accessing the internet and application software 69 for providing additional functionality to the cellular telephone 1. In this embodiment, the application software 69 is part of the audio matching system and causes the cellular telephone to capture the sound 2 for recognition purposes. The application software 69 also generates the above described fine fingerprint which is sent to the audio matching server 5 as a query. The application software 69 also responds to the data received back from the audio matching server 5—for example by outputting information to the user on the display 17; or by retrieving information from another server using a link returned from the audio matching server 5.

Application Software—Frequency Analysis

Figure 3:
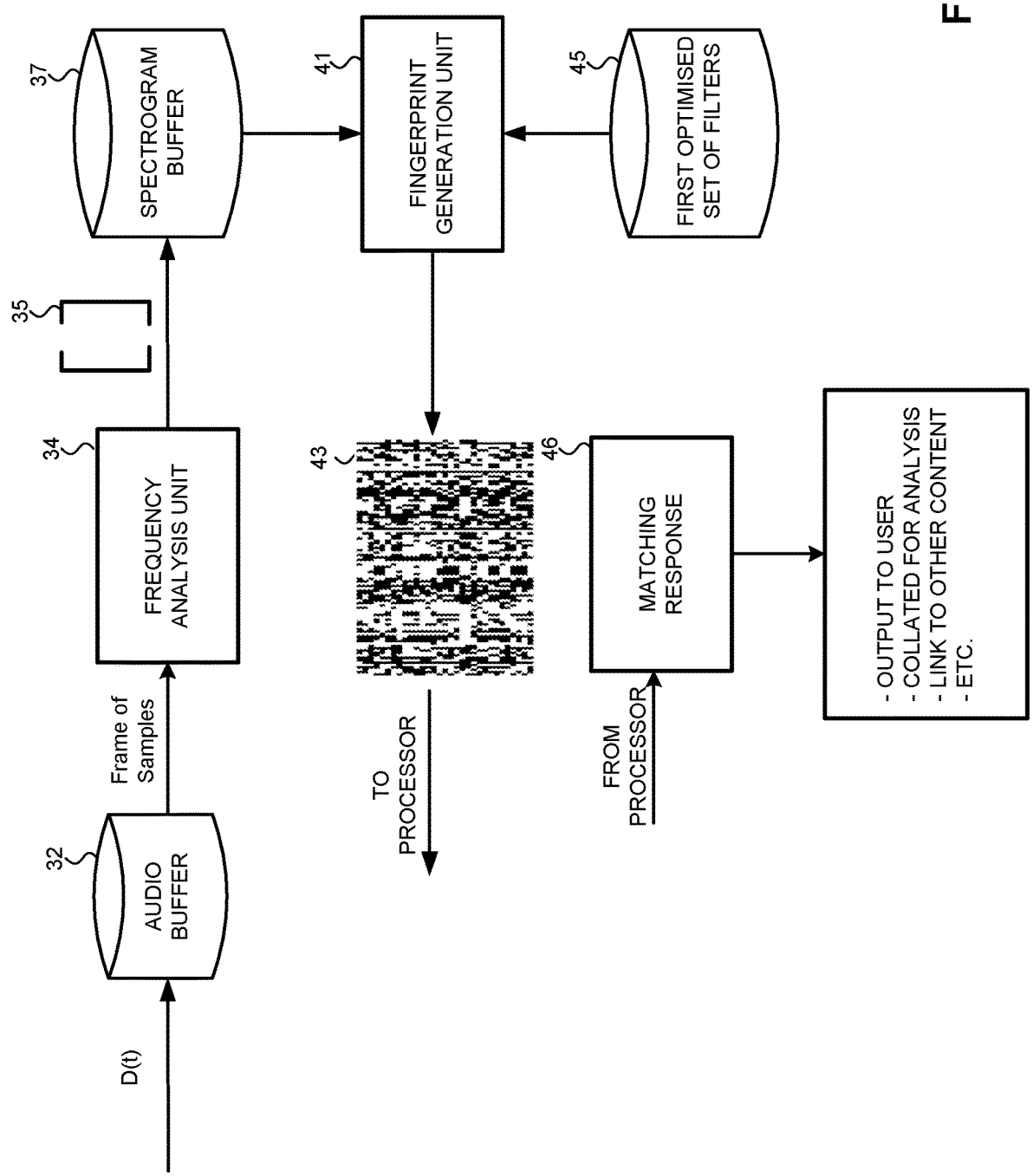
Figure 4:
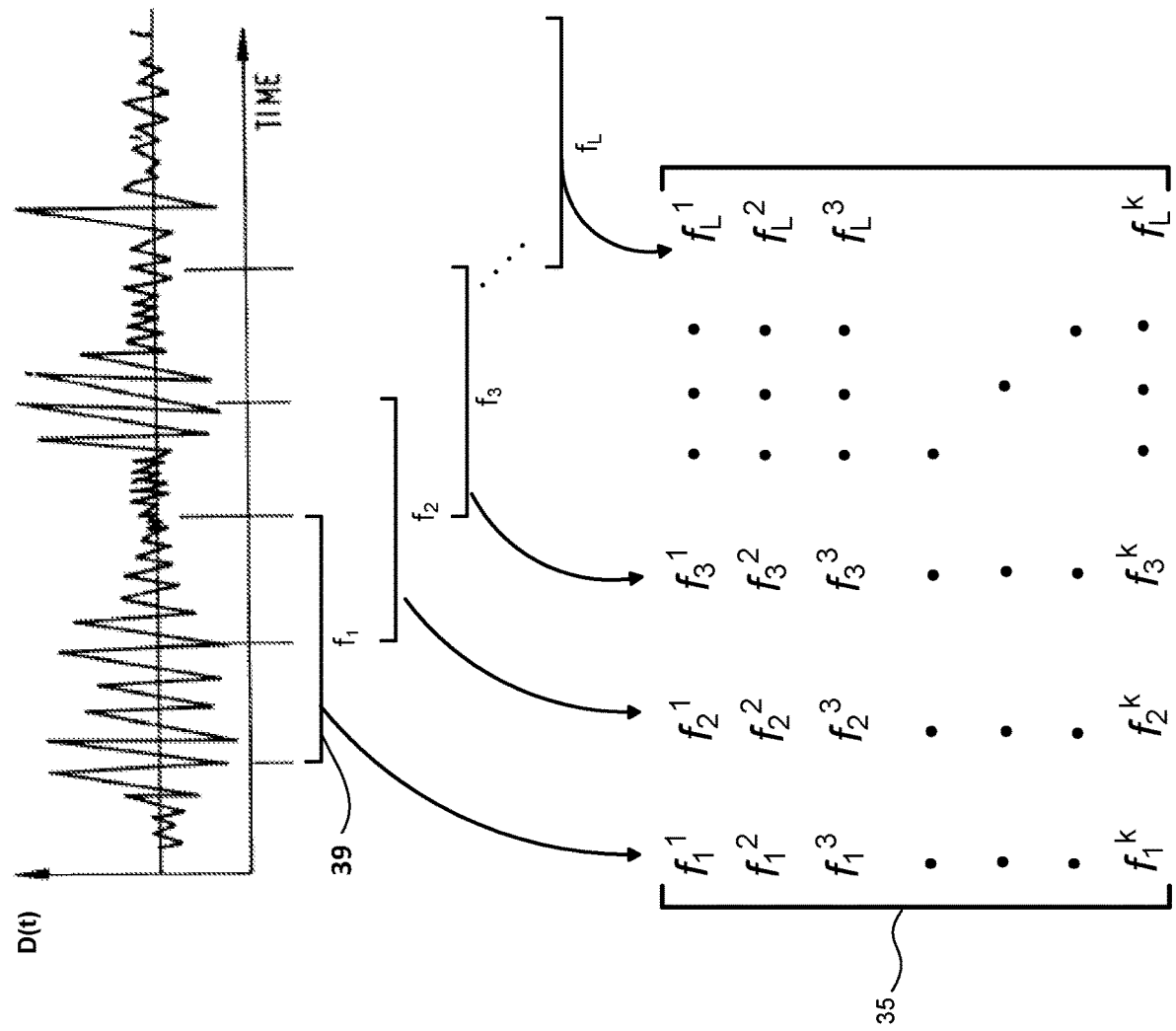

FIG. 3 is a block diagram illustrating the main processing functionality of the application software 69 used in this embodiment. As shown, the application software 69 receives as an input, the sampled audio signal (D(t)) from the A/D converter 53. This sampled audio is stored into an audio buffer 32. The audio samples in the audio buffer 32 are processed by a frequency analysis unit 34 which processes the audio samples in the audio buffer 32 to generate a spectrogram 35 of the audio signal (D(t)) which is stored in the spectrogram buffer 37. The spectrogram 35 is a time and frequency representation of the audio signal (D(t)) and illustrates the way in which the frequency content of the audio signal (D(t)) changes with time over the duration of the audio signal. The frequency analysis unit 34 builds the spectrogram 35 by extracting frames of audio samples from the incoming audio signal D(t) and determining the frequency content of the audio signal in each frame (i.e. what frequencies are present and at what amplitudes). In particular, as illustrated in FIG. 4, the input audio signal D(t) is divided into overlapping frames 39 to allow a "short time" spectral analysis of the audio samples in each frame—as is standard in the field of audio processing. Typically, a frame 39 of samples is extracted once every 10 to 20 milliseconds and the frames 39 may be overlapping (as illustrated) or non-overlapping. Typically, the frequency analysis unit 34 operates in parallel with the writing of the incoming samples into the audio buffer 32. In other words, the frequency analysis unit 34 can start its analysis as soon as the first frame ($f_1$) of audio samples is written into the audio buffer 32 and stops after a predefined time or at the end of the audio clip that is captured by the microphone 23.

As is well known in the art, a windowing function (such as a Hamming window) is typically used to extract the frames 39 of samples from the incoming audio signal (D(t))—to reduce distortions introduced by the extraction. Once a frame 39 of samples has been extracted, the frequency analysis unit 34 performs a frequency analysis process on the audio samples to determine the frequency content within a defined frequency band of interest, which will typically be a portion of the passband of the filter 51. In this embodiment, this frequency band of interest is limited to the band 475 Hz to 2.52 kHz. Other frequency bands may of course be used.

As those skilled in the art will appreciate, the frequency analysis process performed by the frequency analysis unit 34 can be done in a number of different ways—such as by using a Fast Fourier Transform (FFT) or a Discrete Cosine Transform (DCT) or by using wavelet transforms or even by using an array of filter banks. In the preferred embodiment wavelet transforms are used. This frequency analysis will generate, for each frame 39 of audio samples, a vector of numbers—representing the frequency content (amplitude) in each of a number (K) of frequency sub-bands within the defined frequency band of interest (e.g. 475 Hz to 2.52 kHz). Thus as shown in FIG. 4, the frequency analysis of the first frame $f_1$ results in the generation of the vector of numbers $f_1^1, f_1^2, f_1^3 \ldots f_1^K$; where the number $f_1^1$ represents the frequency content in the first frequency sub-band of the audio samples in the first frame, $f_1^2$ represents the frequency content in the second frequency sub-band of the audio samples in the first frame, $f_1^3$ represents the frequency content in the third frequency sub-band of the audio samples in the first frame, etc. The number of sub-bands considered (i.e. the value of K) depends on the available processing power of the processor 63 and the frequency resolution required to extract a meaningful (distinguishable) fingerprint. The inventors have found that a value of K that is between 25 and 50 sub-bands yields good results for a frequency band of interest that is about 2 kHz wide. Similarly, the frequency analysis of the second frame $f_2$ results in the generation of the vector of numbers $f_2^1, f_2^2, f_2^3 \ldots f_2^K$; where the number $f_2^1$ represents the frequency content in the first sub-band of the audio samples in the second frame, $f_2^2$ represents the frequency content in the second sub-band of the audio samples in the second frame, $f_2^3$ represents the frequency content in the third sub-band of the audio samples in the second frame, etc.

As illustrated in FIG. 4, the spectrogram 35 is formed by concatenating the vectors generated from the series of frames 39 extracted from the audio signal D(t). The number of frames extracted (and thus the size (L) of the spectrogram 35) depends on the duration of the incoming audio clip. Typically, a spectrogram corresponding to several seconds' worth of audio will be generated. If the audio clip is too short then it is more likely that the resulting fingerprint will match with multiple entries in the database 15 and if it is too long then this will increase the computations required by the audio matching server 5 to match the fingerprint with the entries in the database 15. To give an example, with an audio sampling rate of 8 kHz and if each frame 39 has 1024 audio samples and with a frame 39 being extracted every 128 audio samples, then an eight second audio clip will result in the size of the spectrogram 35 being L=500.

The spectrogram thus generated is effectively a K×L matrix of values representing the audio clip. The rows of the matrix represent the different frequency sub-bands and the different columns represent different points of time within the audio clip. The individual value in the spectrogram at location (i, j) corresponds to the amplitude of the frequency component in sub-band i at time j. Of course, the matrix could be written in the transpose—with the columns representing the frequency sub-bands and the rows representing the time points. Therefore, references to rows and columns in this document are interchangeable.

Application Software—Fingerprint Generation

Returning to FIG. 3, once the spectrogram 35 has been calculated and stored in the spectrogram buffer 37, a fingerprint generation unit 41 processes the spectrogram 35 to generate a fingerprint 43. The fingerprint generation unit 41 generates the fingerprint 43 by applying a first optimised set 45 of filters to the spectrogram 35 and binarising the result. There are many different possible filter combinations that can be used to generate a fingerprint and the first optimised set 45 of filters has been found through an optimisation process. The way in which this optimisation process is performed will be described later. The way in which this first optimised set 45 of filters is used to generate the fingerprint 43 will now be explained in detail with reference to FIGS. 5a to 5f.

FIG. 5a illustrates five different types of filter 47-1, 47-2, 47-3, 47-4 and 47-5 that can be applied to different parts of the spectrogram 35. Each filter 47 has a height (H) and a width (W) that defines the size of the filter; and an offset (O) that defines the frequency sub-bands of the spectrogram 35 to which the filter 47 will be applied. In this embodiment, the coefficients of each filter 47 sum to zero. Thus, for example, the filter type 47-1 can be formed from the following matrix of coefficients:

$$\begin{bmatrix} -1 & 1 \\ 1 & -1 \end{bmatrix}$$

And the filter type 47-2 can be formed from the following matrix of coefficients:

$$[-1 \ 2 \ -1]$$

FIG. 5b illustrates the way in which a filter 47 (in this case filter 47-1) is applied to the spectrogram 35 at a given offset from the base of the spectrogram. As represented by the arrow 49, the filter 47 is stepped across the time axis of the spectrogram 35 and at each step the coefficients of the filter 47 are used to perform a weighted combination of the frequency values at the relevant part of the spectrogram 35. The number of frequency values that are combined at each step depends on the size (W, H) of the filter 47 and how they are combined depends on the coefficients of the filter 47. The combined value from each step is then written into a vector of combined values that is quantised (or binarised) into "1"s and "0"s depending on whether the combined values are greater or less than zero.

This process is illustrated in more detail in FIGS. 5c to 5e. FIG. 5c illustrates the application of an example filter (that is a type 47-1 filter) that is 2 by 2 in size and having an offset of 10. Thus the filter 47-1 is applied to the values in the spectrogram 35 that are 10 rows up from the bottom of the spectrogram 35 (of course the offset can be defined from any point within the spectrogram 35). In the first step the first block 32 of amplitude values from the spectrogram 35 at the defined offset are combined by multiplying these amplitude values with the corresponding coefficients in the filter 47-1 and then adding the values together. Thus as shown in FIG. 5c, in the first step the amplitude value 6 is multiplied by the filter coefficient −1; the amplitude value 4 is multiplied by the filter coefficient 1; the amplitude value 3 is multiplied by the filter coefficient 1; and the amplitude value 5 is multiplied by the filter coefficient −1. The resulting four numbers are added together to provide a combined result of −4. This value is written in to the first element of a vector 42 of combined values. As illustrated in FIG. 5d, the filter 47-1 is then stepped along one time step and combined in a similar way with the next block 34 of amplitude values from the spectrogram 35. As shown, this combination results in the value 2, which is written in to the next element of the vector 42. This process is repeated until the filter 47-1 has been stepped across the length (time axis) of the spectrogram 35 and the resulting vector 42 will thus have L elements corresponding to the temporal length of the spectrogram 35.

The combined values in this vector 42 will be both positive and negative numbers. In order to simplify the fingerprint 43 that is generated (and thus reduce the data required to represent the fingerprint), these values are quantised into binary values—for example by setting all values above 0 to the binary value "1" and setting all values below zero to the binary value "0"—as shown in FIG. 5e. The resulting binarised vector 44 will form one row of the fingerprint 43 (shown in FIG. 5f). As those skilled in the art will appreciate, this binarisation process can be performed on each combined value as it is generated and written directly in to the binarised vector 44—instead of generating the intermediate vector 42 first.

As discussed above, the fingerprint 43 is generated by applying a first optimised set 45 of these filters 47 to the spectrogram 35. Each different filter 47 in this first set 45 will produce a different row of the final fingerprint 43. Thus, concatenating the different binary vectors 44 produced by applying the first set 45 of filters to the spectrogram 35 into a matrix, forms the final output 2D fingerprint 43. The order in which the binary vectors 44 are concatenated is determined in advance and the same first set 45 of filters and ordering are used to generate corresponding fingerprints for the entries in the database 15—so that the audio matching server 5 can compare fingerprints that have been generated in the same manner. In this embodiment, the first set 45 of filters comprises thirty two different filters and so the fingerprint that is generated will be a 32 by L matrix of binary values. Thirty two filters were chosen as this allows for convenient processing of the fingerprints by a 32 bit or a 64 bit processor (which may be used, for example, to perform the fingerprint matching process in the audio matching server 5). However, as those skilled in the art will appreciate any number of filters may be used in the first set 45.

Further, as before, the rows and columns of the fingerprint 43 are interchangeable. Thus instead of the binary vectors 44 forming the rows of the fingerprint 43, they may be used to form the columns. In this case the fingerprint will be an L by 32 matrix of binary values. As long as the same process is performed to generate the fingerprints for the entries in the audio database 15, the orientation of the fingerprint 43 does not matter.

Fingerprint Row/Column Ordering

Figure 6:
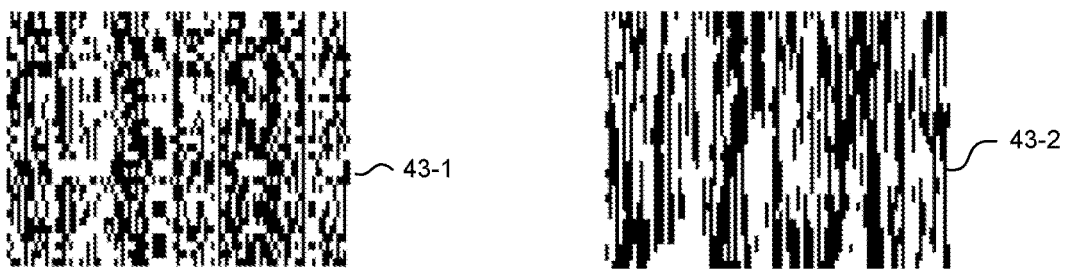

As discussed above, the binary vectors 44 generated by applying the filters 47 in the optimised set 45 to the spectrogram 35 are concatenated together in an order that is defined in advance. Normally, the order does not matter—as long as the same order is applied when generating the fingerprints for the entries in the database 15. This means that in a conventional fingerprint, the 1s and 0s will be appear randomly distributed throughout the fingerprint—such as for the example fingerprint 43-1 shown in FIG. 6. However, in this embodiment, the ordering is chosen in a specific way—in particular in a way that maximises (or at least increases) the likelihood that adjacent binary vectors 44 (i.e. adjacent rows or columns) in the fingerprint 43 will be similar to each other. As will be explained in further detail later, this specific ordering is determined during a training stage in which fingerprints are generated for a large collection of audio samples and the ordering is found that maximises the likelihood of adjacent rows/columns in the fingerprint 43 being similar. This specific ordering is defined within the application software 69 and controls the way in which the fingerprint generation unit 41 concatenates the binary vectors 44 to form the fingerprint 43. FIG. 6 also shows a second example fingerprint 43-2 that is generated using the specific ordering discussed above. As can be seen, the fingerprint 43-2 is much less random in appearance that the fingerprint 43-1 as many more adjacent bits in the fingerprint 43-2 have the same value and thus clump together to define larger islands of the same binary value. As will be explained later, this is important for the remote audio server 5 to be able to generate a coarse fingerprint from the fingerprint 43 that will reduce the processing burden to find a matching entry in the database 15.

As those skilled in the art will appreciate, as the ordering of the binary vectors 44 is known in advance, the individual binarised values could be written directly in to the relevant part of the fingerprint 43 without being written into a binary vector 44 first. The explanation above has been given for ease in understanding the way in which the fingerprint 43 is generated.

Application Software—Matching Response

Returning to FIG. 3, once the fingerprint 43 has been generated, the application software 69 passes the fingerprint 43 to the processor 63 for transmission to the audio matching server 5. As the application software 69 is designed to work with the audio matching server 5, the application software 69 will have stored therein address information for the audio matching server 5 so that it can send the fingerprint to the audio matching server 5; either via the telecommunications network 9 or via the computer network 13. The application software 69 will pass this address information and the generated fingerprint 43 to the processor 63 requesting that the fingerprint 43 is sent to the remote audio matching server 5. The processor 63 will then send the fingerprint 43 to the audio matching server 5 and awaits a response message. When the matching response message 46 is returned from the audio matching server 5 (either via the telecommunications network 9 or via the computer network 13), the processor 63 will receive and pass the matching response message 46 back to the application software 69. The application software 69 then takes an appropriate action based on the contents of the matching response message 46. For example, if the matching response message 46 simply provides details of the captured audio—such as the name of the song, the artist etc. then the application software 69 may output this information to the user such as via the display 17 or the loudspeaker 25. If the matching response message 46 includes a link for further information or content relating to the captured audio, then the application software 69 may prompt the user whether the user wishes to retrieve the information or content from the link provided. In response to the user agreeing to the retrieval (for example by pressing a key 33 on the keypad 31), the application software 69 may retrieve the information or content from the link itself or it may call upon the browser software 68 to retrieve the information or content (which retrieved information or content is then output to the user, for example on the display 17). If the application software 69 forms part of an audience surveying application, then the application software 69 may simply collate the information about the audio that has been captured (such as the TV channel and programme being watched) and then send this to the remote audience surveying server 19 together with an identifier of the user that owns the phone (which may just be an identifier of the phone 1). If the matching response message 46 is a "nil" report—indicating that no matches have been found then the application software 69 may output this information to the user.

Audio Matching Server

Figure 7:
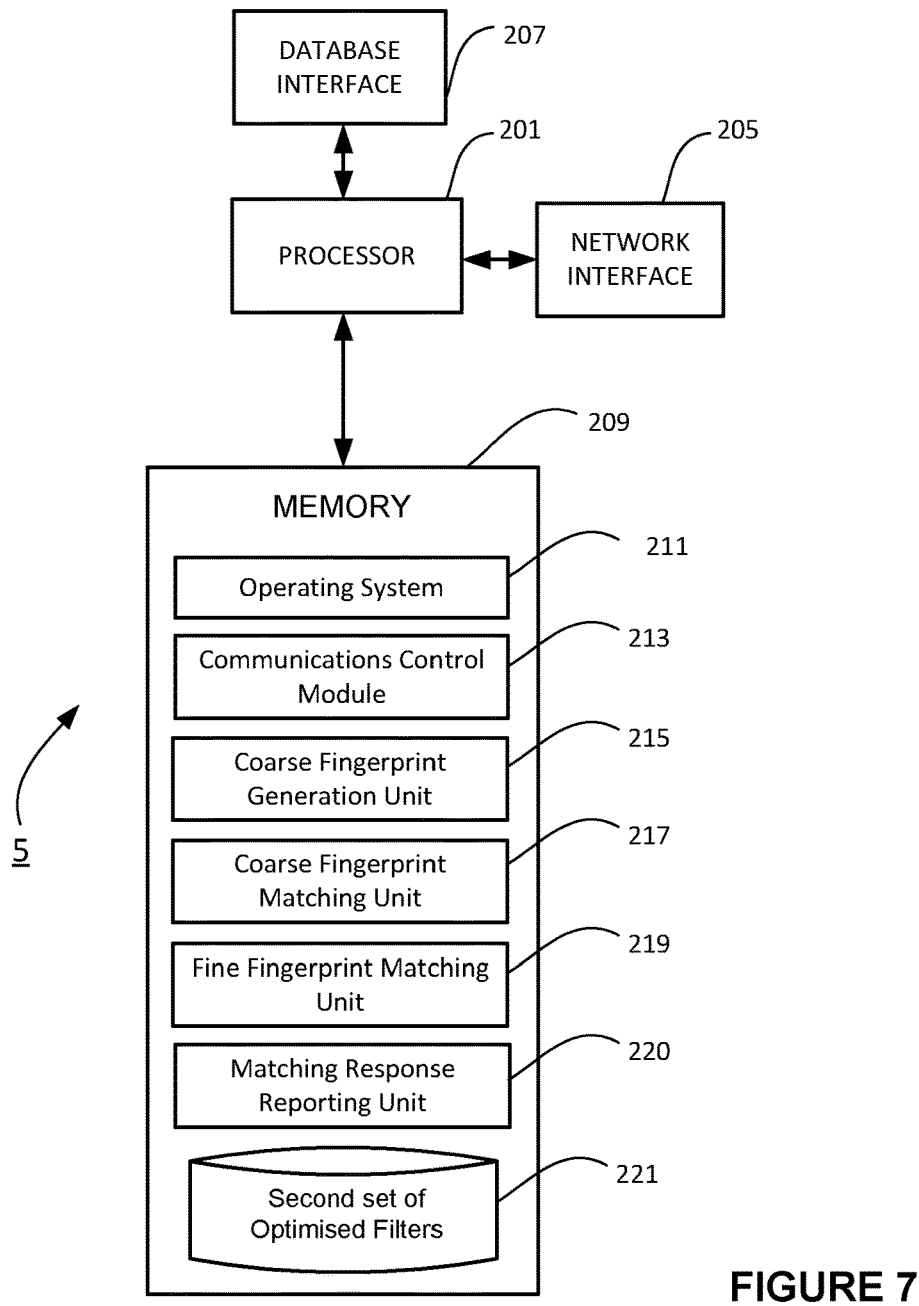

FIG. 7 is a block diagram of the main components of the audio matching server 5 used in this embodiment. As shown, the audio matching server 5 includes a processor (which may be one or more central processing units) 201 that communicates with the user device 1 via a network interface 205 and the telecommunications network 9 or the computer network 13. The processor 201 also communicates with the database 1543 via a database interface 207. In practice, the interfaces 205 and 207 may be formed by a single physical interface, such as a LAN interface or the like.

In this embodiment, the processor 201 is controlled by software instructions stored in memory 209 (although in other embodiments, the processor 201 may be formed from one or more dedicated hardware processors—such as Application Specific Integrated Circuits). The software instructions include an operating system 211 that controls the overall operation of the audio matching server 5; a communications control module 213 that controls communications between the audio matching server 5 and the user device 1 and the database 15; a coarse fingerprint generation unit 215 that generates a coarse fingerprint from the query fingerprint 43 received from a user device 1; a coarse fingerprint matching unit 217 that matches the coarse fingerprint generated by the coarse fingerprint generation unit 215 with coarse fingerprints stored in the database 15; a fine fingerprint matching unit 219 that matches the fingerprint 43 received from the user device 1 with a fine fingerprint of a subset of the entries in the database 15 to identify a matching entry; and a matching response reporting unit 220 that reports the matching results back to the user device 1 in a matching response message 46. As will be explained in more detail below, the coarse fingerprint generation unit 215 generates the coarse fingerprint using a second set 221 of optimised filters that is stored in the memory 209.

As discussed above, the audio matching server 5 performs matching operations between coarse/fine fingerprints corresponding to a query received from the user device 1 and coarse/fine fingerprints stored within the database 15. To distinguish between these different fingerprints, the fingerprint 43 received from the user device 1 will be referred to the "fine query fingerprint" 43 and the coarse fingerprint that is generated from it will be referred to as the "coarse query fingerprint". The fingerprints stored in the database 15 will be referred to as "coarse database fingerprints" and "fine database fingerprints".

Coarse Fingerprint Generation Unit

As mentioned above, in this embodiment, the coarse fingerprint generation unit 215 generates the coarse query fingerprint from the fine query fingerprint 43 received from the user device 1. This is advantageous as it means that the user device 1 does not need to transmit, for example, the spectrogram 35 of the audio clip to the audio matching server 5 in order for the coarse query fingerprint to be generated.

FIG. 8 illustrates the process used by the coarse fingerprint generation unit 215 to generate the coarse query fingerprint. The process is very similar to the process used to generate the fine query fingerprint (described above with reference to FIG. 5) except that a second (different) set 221 of optimised filters is used and in this case the filters 47 of this second set 221 are applied to the fine query fingerprint 43 rather than to the spectrogram 35. Additionally, instead of each filter 47 in this second set 221 of optimised filters being stepped over the fine query fingerprint 43 one time point at a time, several time points are skipped at each stage—in order to reduce the size of the coarse query fingerprint. In this embodiment, the filters skip 10 time points between each stage and the number of filters in the second set 221 of filters is kept the same as in the first set 45 (=32). The result is a compact (coarse) fingerprint that allows for a quicker initial search of the entries in the database 15. Of course, the coarse fingerprints could be made even more compact by reducing the number of filters 47 used in the second set 221 (compared with the number of filters used in the first set 45). Thus, in the example above, if the fine query fingerprint has a bit rate (or resolution) of 2000 bits per second of the captured audio signal, then the coarse query fingerprint will have a bit rate (or resolution) of 200 bits per second of the captured audio signal.

Figure 8A:
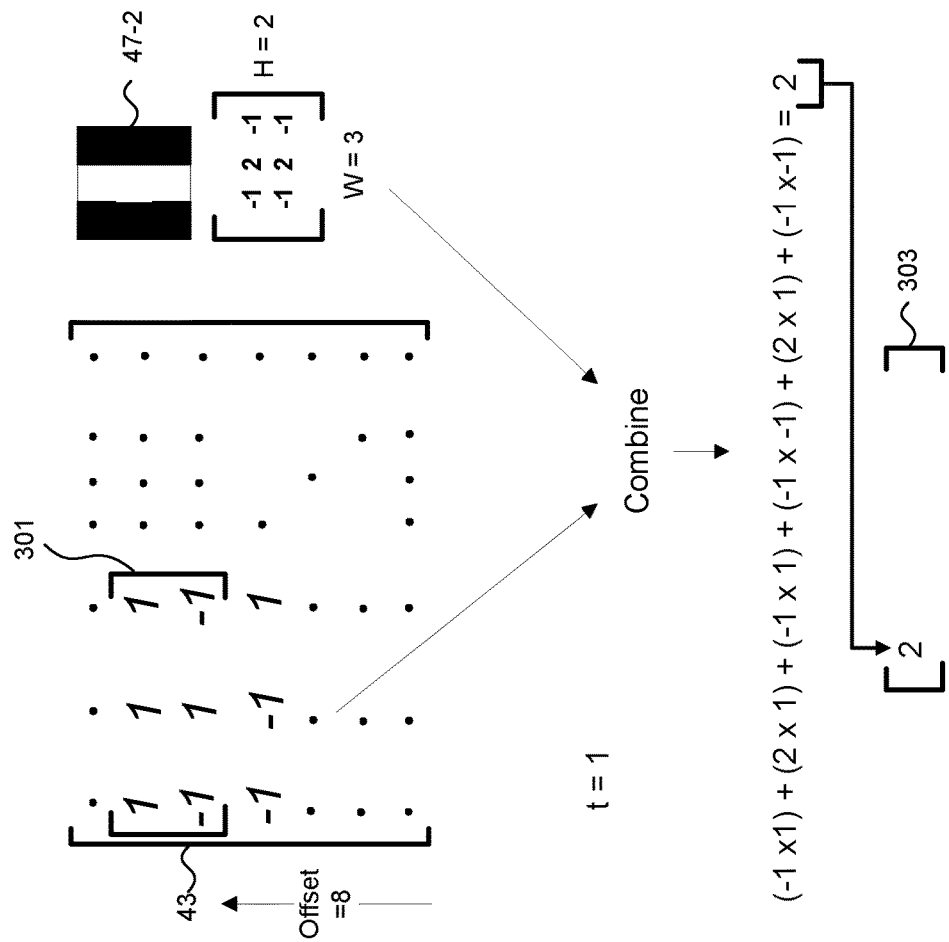

FIG. 8a shows the fine query fingerprint 43 written in matrix format and with binary "0"s being written as the value −1. This ensures that the filtering process accurately combines the different parts of the fine query fingerprint 43 that are to be combined with the filter. In this example, the filter 47 being applied to the fine query fingerprint 43 is a type 47-2 filter having height 2 and width 3. The width (temporal dimension) of the filter is usually larger than this and the value of 3 has been chosen for simplicity of illustration. The filter width is typically about twice the temporal decimation rate between the fine fingerprint and the coarse fingerprint. So if the coarse fingerprint data rate is $\frac{1}{10}^{th}$ that of the fine fingerprint, the decimation rate is 10 and the typical filter width would be 20, although each filter can have a different width. If the width is less than the decimation rate, e.g. 4 in this example, then 6 out of 10 of the fine fingerprint values would have no impact on the coarse fingerprint values. The filter has an offset of 8 meaning that the filter 47 is applied to the elements in the fine query fingerprint 43 that are 8 rows from the bottom. The filter 47 is applied to the first block 301 of values in the fine query fingerprint 43 (corresponding to time point t=1). The size of this block 301 matches that of the filter 47—so that each value in the block 301 has a corresponding filter coefficient with which it is multiplied—as shown. The multiplied values are summed to yield the value 2—which is written in the first element of the vector 303. At the next step, the filter 47 is moved along the time axis of the fine query fingerprint 43—but this time skipping some of the elements in the fine query fingerprint 43. In this example, the filter is skipped along 10 elements (time points); meaning that the coarse query fingerprint that is generated will have $\frac{1}{10}^{th}$ of the temporal length of the fine query fingerprint 43.

Figure 8B:
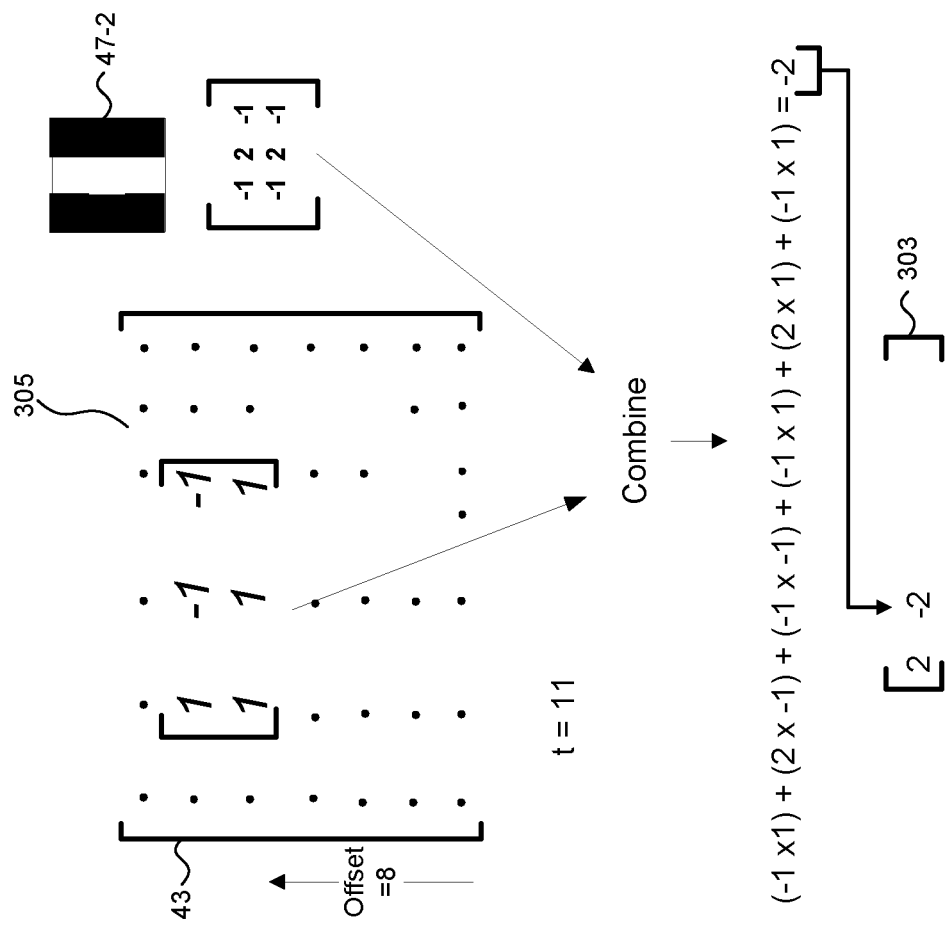
Figure 8C:
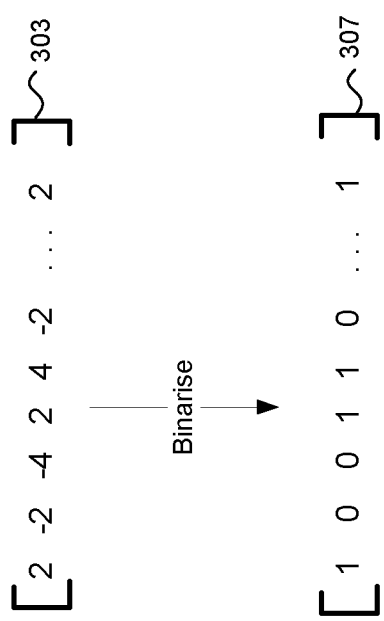
Figure 8D:
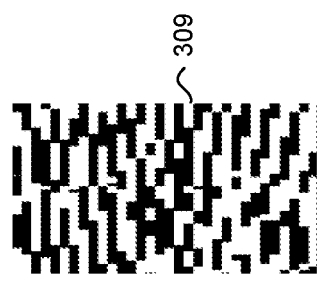

FIG. 8b illustrates that the next block 305 of values (at time t=11) in the fine query fingerprint 43 are combined in the same way with the filter coefficients to generate the value −2 which is written in to the next place in the vector 303. Once the filter 47 has been stepped along the fine query fingerprint 43 and the vector 303 has been filled, the vector 303 is binarised (as shown in FIG. 8c) to produce a binary vector 307. As before, this binarisation can be done at the time that each combined value is generated and then written directly into the binary vector 307 without using the vector 303 (or written directly into the coarse query fingerprint). The binary vector 307 that is produced will form one row (or one column) of the coarse query fingerprint. The same process is repeated for all the different filters 47 in the second set 221 of optimised filters and the resulting binary vectors 307 are concatenated to form the coarse query fingerprint 309 (shown in FIG. 8d). Again, as long as the binary vectors 307 are concatenated in the same order that was used to concatenate the binary vectors that were generated to form the coarse database fingerprints, then the audio matching server 5 can perform a proper match between the coarse query fingerprint 309 and the coarse database fingerprints.

The inventors have found that the coarse fingerprint generated in this way is still sufficiently distinctive to allow it to be used in an initial search of the database 15 in order to significantly reduce the number of database entries that have to be compared with the fine query fingerprint. This is because of the specific ordering that was performed to generate the fine query fingerprint. This ordering means that there are larger (information containing) bit patterns in the fine fingerprint and the information contained in these larger bit patterns survive to some extent through the process of generating the corresponding coarse fingerprints. If a more traditional (random looking) fine fingerprint (such as the fingerprint 43-1 shown in FIG. 6) is used, then the above process of generating a coarse fingerprint from the fine fingerprint is likely to result in the loss of most of the information contained in the fine fingerprint. This means that the coarse fingerprint will not be distinctive and so when it is compared against other similar coarse fingerprints, many are likely to be considered a possible match. This may defeat the purpose of generating the coarse fingerprint—as the fine query fingerprint will still have to be matched with a large number of potentially matching database entries.

Coarse Fingerprint Matching Unit

Once the coarse query fingerprint 309 has been generated, the coarse fingerprint matching unit 217 compares the coarse query fingerprint 309 with coarse database fingerprints stored in the database 15 in order to identify a subset of the database entries that may be a possible match.

Figure 9:
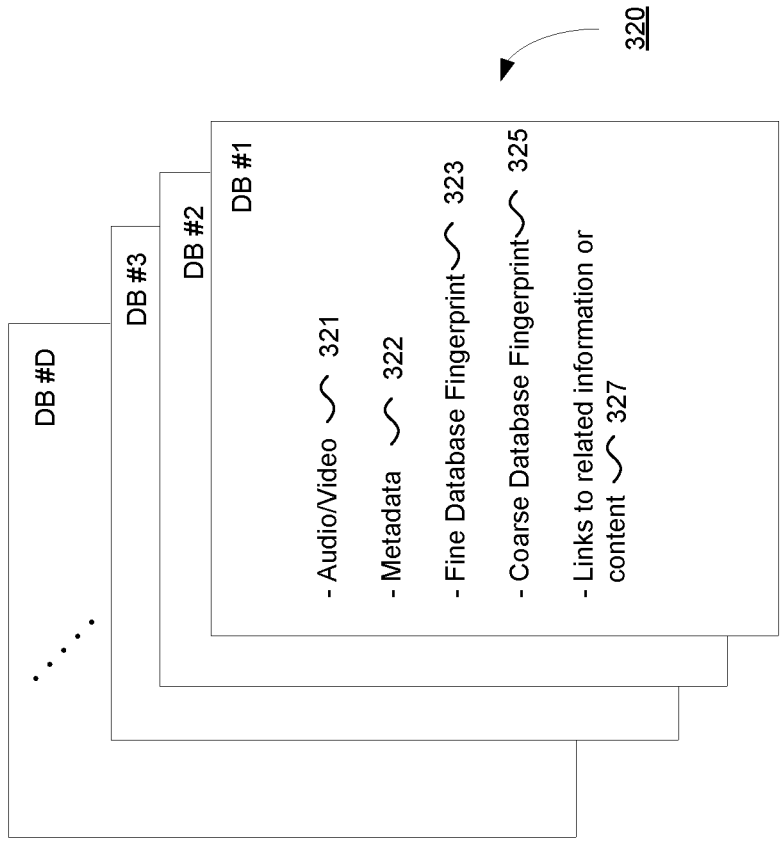

FIG. 9 illustrates the general structure of the database entries 320. Each entry has an identifier—DB #1 for the first entry, DB #2 for the second entry etc. As shown in FIG. 9, there are D entries in the database 15. The value of D can be very large depending on the application. If the audio matching system is for use in a "Shazam®" type of service, then D may be of the order of 10 to 20 million. However, if the audio matching system is part of an audience surveying system that is designed to identify the programme and channel the user is watching, then the number of entries (D) will be much lower, although the audio clips (or at least the fingerprints representing them) stored in the database 15 will be much longer. For example, a system designed to monitor television broadcasts made over the previous 30 days on 1000 TV channels will contain about 720,000 hours of content—which is equivalent in size to a Shazam® type of system with 10 million songs.

As shown in FIG. 9, each entry will typically include:
- the audio and/or video content 321 (although this is strictly not necessary);
- metadata 322 for that content (such as the name of the song, artist, TV programme, TV channel, time of broadcast, director etc.);
- a fine database fingerprint 323 that is generated from the audio in the content in the same way that the fine query fingerprint 43 is generated;
- a coarse database fingerprint 325 for the audio in the content that is generated from the fine fingerprint 323 in the same way that the coarse query fingerprint 309 was generated from the fine query fingerprint 43 (as explained above);
- Links 327 and other information related to the audio and/or video content.

Figure 10B:
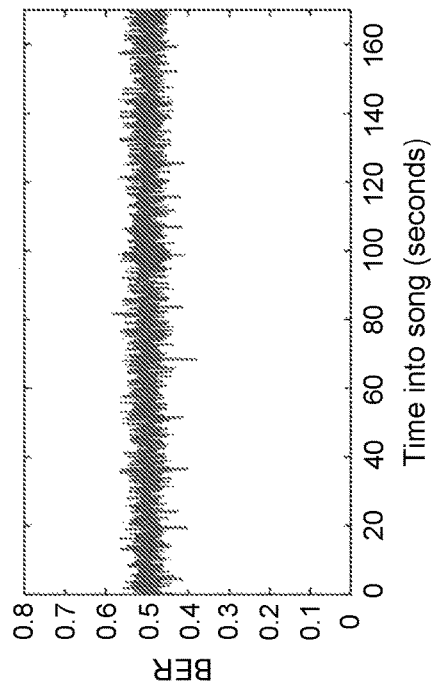
Figure 10C:
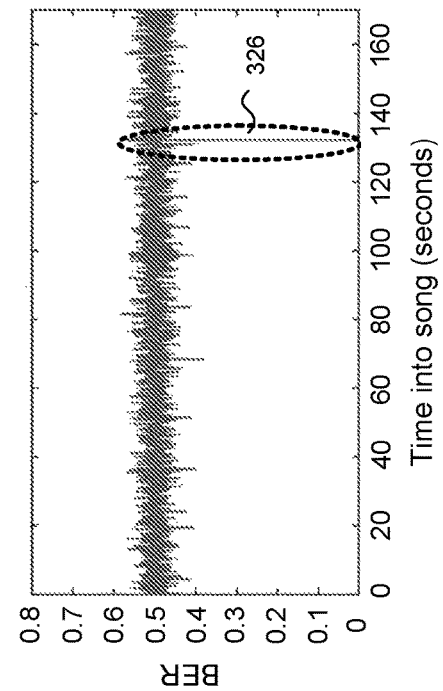
Figure 10A:
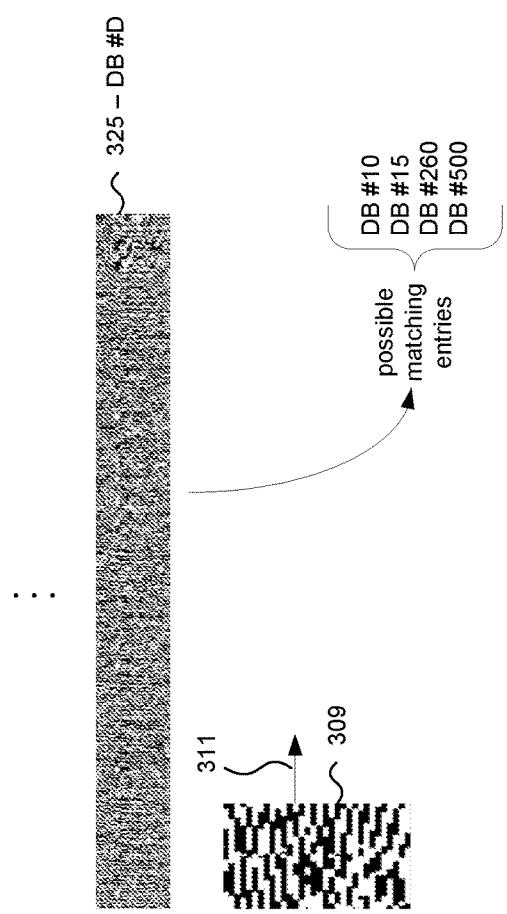

Thus, once the coarse query fingerprint 309 has been generated, the coarse fingerprint matching unit 217 matches (i.e. compares) the coarse query fingerprint 309 with the coarse database fingerprint 325 stored in every entry 320 of the database 15; in order to identify a number of possible matching entries. This matching process is illustrated in FIG. 10. In particular, FIG. 10a illustrates all the coarse database fingerprints 325. The coarse database fingerprint for the first database entry is labelled 325-DB #1, the coarse database fingerprint for the second database entry is labelled 325-DB #2, the coarse database fingerprint for the third database entry is labelled 325-DB #3 etc. FIG. 10a illustrates that these coarse database fingerprints 325 have different temporal lengths. This is because they are typically generated from audio content having different durations.

FIG. 10a also illustrates the coarse query fingerprint 309 that is to be compared with each of these coarse database fingerprints 325. Typically (and as shown in FIG. 10a), the coarse query fingerprint 309 has a much shorter duration than the coarse database fingerprints 325. To match the coarse query fingerprint 309 with a coarse database fingerprint 325, the coarse query fingerprint 309 is "stepped along" the longer coarse database fingerprint 325 from start to end. At each step a bit-wise comparison is performed between the bits in the coarse query fingerprint 309 and the bits in a corresponding sized portion of the coarse database fingerprint 325. As is well known, this bit-wise comparison may be performed using an XOR type of combination of the bits from the two fingerprints—which results in a count of the number of bit differences between the two. This count therefore, represents the similarity between the coarse query fingerprint 309 and the current portion of the coarse database fingerprint 325. The coarse query fingerprint 309 is then stepped along the temporal axis and compared in a similar manner with the next portion of the coarse database fingerprint 325. Typically, the coarse query fingerprint 309 is stepped along one time point at a time in the coarse database fingerprint 325.

In this embodiment the bit-wise comparison considers the percentage of non-matching bits. Thus if there is not a match then the expected percentage of non-matching bits should be around 50% (or 0.5). If there is a match then the expected percentage of non-matching bits should be close to zero. FIG. 10b illustrates the result of this matching process when the coarse query fingerprint 309 does not match with any portion of a coarse database fingerprint 325; and FIG. 10c illustrates the result of this matching process when the coarse query fingerprint 309 does match with a portion of the coarse database fingerprint 325 (identified by the spike 326 in the percentage of non-matching bits). Whether or not the coarse query fingerprint 309 matches with a portion of the coarse database fingerprint 325 is, therefore, determined by comparing the calculated percentages with a threshold level (e.g. 10%). Thus, if the percentage of non-matching bits falls below this threshold then there is a match, if it does not then there is no match. As those skilled in the art will appreciate, other scoring metrics could be used instead.

The comparison result for the comparison between the coarse query fingerprint 309 and the coarse database fingerprints 325 includes a list of database entries 320 that might match with the coarse query fingerprint 309. In FIG. 10a, this list of possible matching entries includes entries DB #10, DB #15, DB #260 and DB #500. The comparison results may also optionally include timing information identifying which portion(s) within the coarse database fingerprint 325 matches with the coarse query fingerprint 309. Thus, for example, in the match shown in FIG. 10c, the timing information may indicate that the match was found around 135 seconds from the start of the song represented by the coarse database fingerprint 325. If provided, this timing information can be used to further narrow down the comparison between the fine query fingerprint 43 and the corresponding fine database fingerprints 323.

Fine Fingerprint Matching Unit

The comparison results obtained from the coarse fingerprint matching unit 217 are then passed to the fine fingerprint matching unit 219 which use this information to restrict the matching operation that it does between the fine query fingerprint 43 and the fine database fingerprints 323. In particular, the fine fingerprint matching unit 219 uses the list of possible matching entries so that the fine fingerprint comparisons are restricted to just the fine fingerprints in the database entries identified in this list of possible matching entries. Further, if the comparison results include timing information indicating the time within the audio content where the match was found in the coarse database fingerprint 325, then the fine fingerprint matching unit 219 uses this timing information to restrict the comparison between the fine query fingerprint 43 and the corresponding fine database fingerprint 323 to around this timing. So for example, if the match was found at 135 seconds from the start of the coarse fingerprint 325 then the fine matching unit 219 may restrict the matching process so that the fine query fingerprint 43 is only matched with the portions of the fine database fingerprint between times 130 and 145 seconds from the start.

Figure 11:
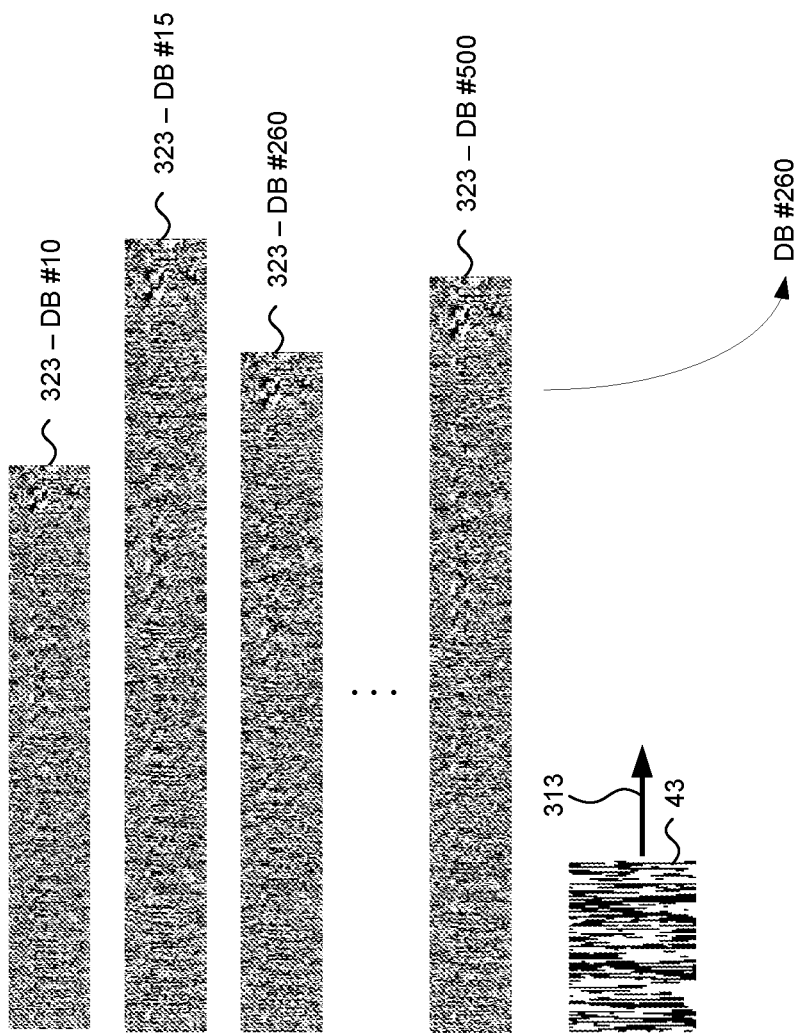

FIG. 11 illustrates the matching process that is performed between the fine query fingerprint 43 and each of the fine database fingerprints 323-DB #10, 323-DB #15, 323-DB #260, and 323-DB #500 (when such timing information is not available). As illustrated by the arrow 313, the matching process steps the fine query fingerprint 43 along each of these fine database fingerprints—in the same way that the coarse query fingerprint 309 was stepped along the coarse database fingerprints 325. At each step, a similar bit-wise comparison is made between the fine query fingerprint 43 and the corresponding portion of the fine database fingerprint 323 to determine the percentage of non-matching bits. The fine fingerprint matching unit 219 uses the determined percentage of non-matching bits to determine if there is a match—again by comparing the determined percentage of non-matching bits with a threshold. If the fine fingerprint matching unit 219 identifies a single database entry as a match then it reports the identifier for the matching database entry (e.g. DB #260) to the matching response reporting unit 220. However, if the fine fingerprint matching unit 219 identifies more than one possible match, then it compares the percentage of non-matching bits for each suspected match to identify which database entry has the smallest percentage of non-matching bits; and then reports this one as the matching result to the matching response reporting unit 220. If, on the other hand, none of the possible matching fine database fingerprints do actually match with the fine query fingerprint 43, then the fine fingerprint matching unit 219 may either return a "nil" result to the matching response reporting unit 220 or it may perform a full match between the fine query fingerprint 43 and all the other fine database fingerprints 323 that were excluded from the original fine matching process due to the results from the coarse matching process.

Matching Response Reporting Unit

The matching response reporting unit 220 either receives a "nil" report or the identifier for the database entry 320 that matches with the fine query fingerprint. If a "nil" report is received then the matching response reporting unit 220 returns a "nil" response back to the user device 1. If a database identifier is received, then the matching response reporting unit 220 retrieves relevant information from the corresponding database entry 320. The information retrieved may include the stored metadata 322 and/or stored links 327 from the identified database entry 320. This information is then returned to the user device 1 in a matching response message 46.

Training

Identifying the First Optimised Set of Filters

The above description describes the operation of an audio matching system that uses audio fingerprints to identify captured audio. In order to generate the fine fingerprint 43, a first set 45 of optimised filters was applied to the spectrogram 35 of the captured audio. The way in which this first set 45 of optimised filters is determined will now be explained. This process happens in advance during a training routine.

As discussed above with reference to FIG. 5a, in this embodiment, there are five different types of filter 47 that can be used. Each filter 47 can vary in height and in width.

In the example system explained above, the spectrogram 35 had thirty-two frequency sub-bands, so the height can have a value from 1 to 32. Whilst the width could in theory be any value up to the overall length of the spectrogram 35, for simplicity the width is also allowed to have a value between 1 and 32. It is possible to apply each filter 47 at any part of the spectrogram 35, i.e. it can have any offset value between 1 and 31. Note, however, that some filters must always have a width that is a multiple of two, and some must have a width that is a multiple of three to ensure symmetry. Furthermore, a filter having an offset value of 10 can only have, at maximum, a height of 22. Taking all such limitations into account, the total number of possible filters ($N_f$) is $3 \times 16 \times 8 \times 32 + 2 \times 10 \times 6 \times 32 = 16,128$ filters. The training process described below allows an optimal set (combination) of filters 47 to be identified without having to consider every possible combination ($16,128^{32} = 4 \times 10^{134}$ combinations).

FIG. 12 illustrates part of the training process. As shown, the process uses a database 351 of original audio clips and a database 353 of distorted audio clips. The distorted audio clips in database 353 are distorted versions of the original audio clips in database 351. The distortions include those normally encountered through the transmission of the original audio clips over a communications channel (which includes an acoustic channel). Thus, the distorted version might represent the audio after it has been output as a sound signal and picked up by the microphone of a user device. As will be described below, the training process applies each of the approximate 16,000 possible filters 47 to a set of matching pairs from the databases 351 and 353 and also to a set of non-matching pairs from the databases 351 and 353 and uses the results to identify an optimal set of filters that will generate distinctive fingerprints.

Figure 12A:
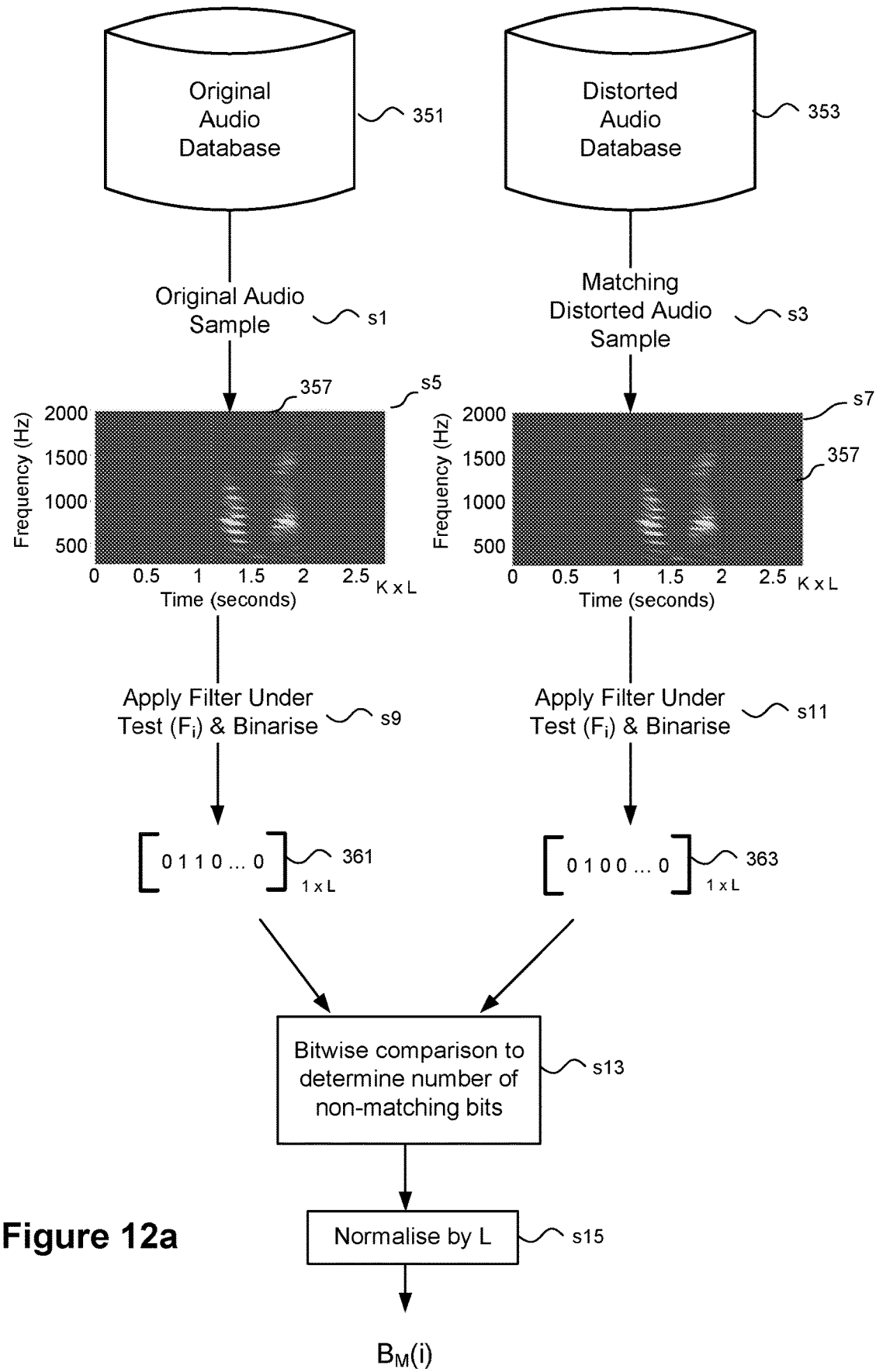
Figure 12B:
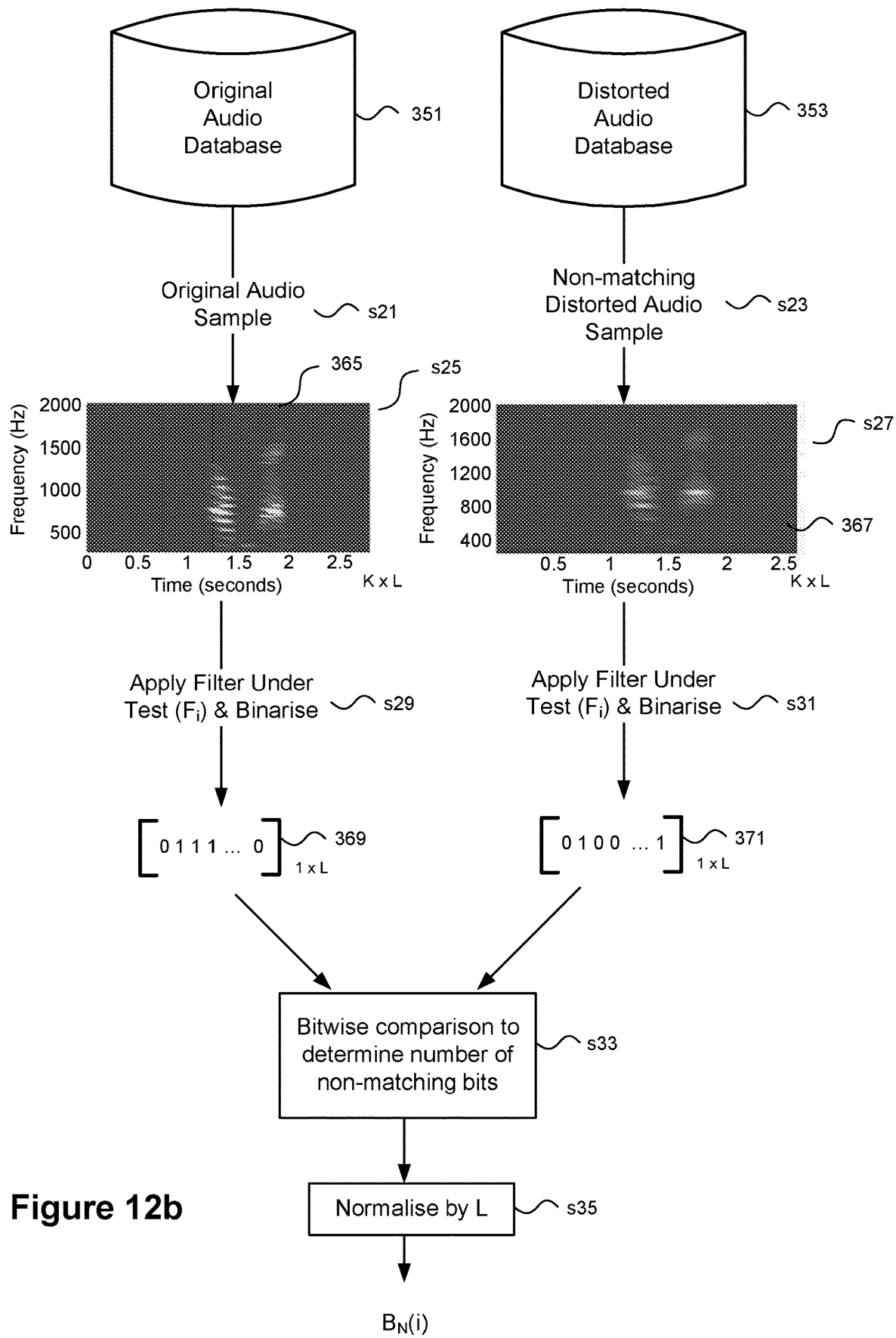

FIG. 12a illustrates the initial part of the training process in which a current filter under consideration (filter F(i)) is applied to a pair of matching audio clips and FIG. 12b illustrates the same process but when the filter (F(i)) under consideration is applied to a pair of non-matching audio clips. In this context, a matching pair of audio clips includes the original audio clip from database 351 and the corresponding distorted version of that original audio clip from database 353; and a non-matching pair of audio clips includes an original audio clip from the database 353 and a distorted version of a different original audio clip from the database 353.

Referring to FIG. 12a, in step s1, the original audio clip is read out from the database 351 and in step s3 the corresponding (matching) distorted audio clip is read out from database 353. In step s5 a spectrogram 357 is determined for the original audio clip and in step s7 a spectrogram 359 is determined for the distorted audio clip. These spectrograms are determined in the manner discussed above with reference to FIG. 4. In step s9 the current filter under consideration (F(i)) is applied to the spectrogram 357 and the result binarised to generate the binary vector 361. Similarly, in step s11 the same filter (F(i)) is applied to the spectrogram 359 and the result binarised to generate the binary vector 363.

In step s13, a bit-wise comparison is performed between the vectors 361 and 363 to determine the number of non-matching bits. This can be achieved using a simple XOR comparison between the two vectors. In step s15 the determined number of non-matching bits is normalised by the length of the spectrogram (L)—to take into account the different lengths of the matching pairs of audio clips stored in the databases 351 and 353, to generate a value $B_M(i)$ that effectively defines the percentage of non-matching bits (i.e. the bit error rate) between the matching pair of audio clips.

As can be seen from FIG. 12b, a very similar process is carried out for a non-matching pair of audio clips taken from the databases 351 and 353. In step s21, an original audio clip is read out from the database 351 and in step s23 a non-matching distorted audio clip is read out from database 353. If the two non-matching audio clips have different durations then the duration of the longer clip can be truncated to match that of the shorter clip. In step s25 a spectrogram 365 is determined for the original audio clip and in step s27 a spectrogram 367 is determined for the non-matching distorted audio clip. These spectrograms are determined in the manner discussed above with reference to FIG. 4. In step s29 the filter under consideration (F(i)) is applied to the spectrogram 365 and the result binarised to generate the binary vector 369. Similarly, in step s31 the same filter (F(i)) is applied to the spectrogram 367 and the result binarised to generate the binary vector 371. In step s33, a bit-wise comparison is performed between the vectors 369 and 371 to determine the number of non-matching bits. As before, this can be achieved by using a simple XOR comparison between the two vectors. In step s35 the determined number of non-matching bits is normalised by the length of the spectrogram (L)—to take in to account the different lengths of the matching pairs of audio clips stored in the databases 351 and 353, to generate a value $B_N(i)$ that effectively defines the percentage of non-matching bits (i.e. the bit error rate) for the non-matching pair of audio clips.

Figure 13A:
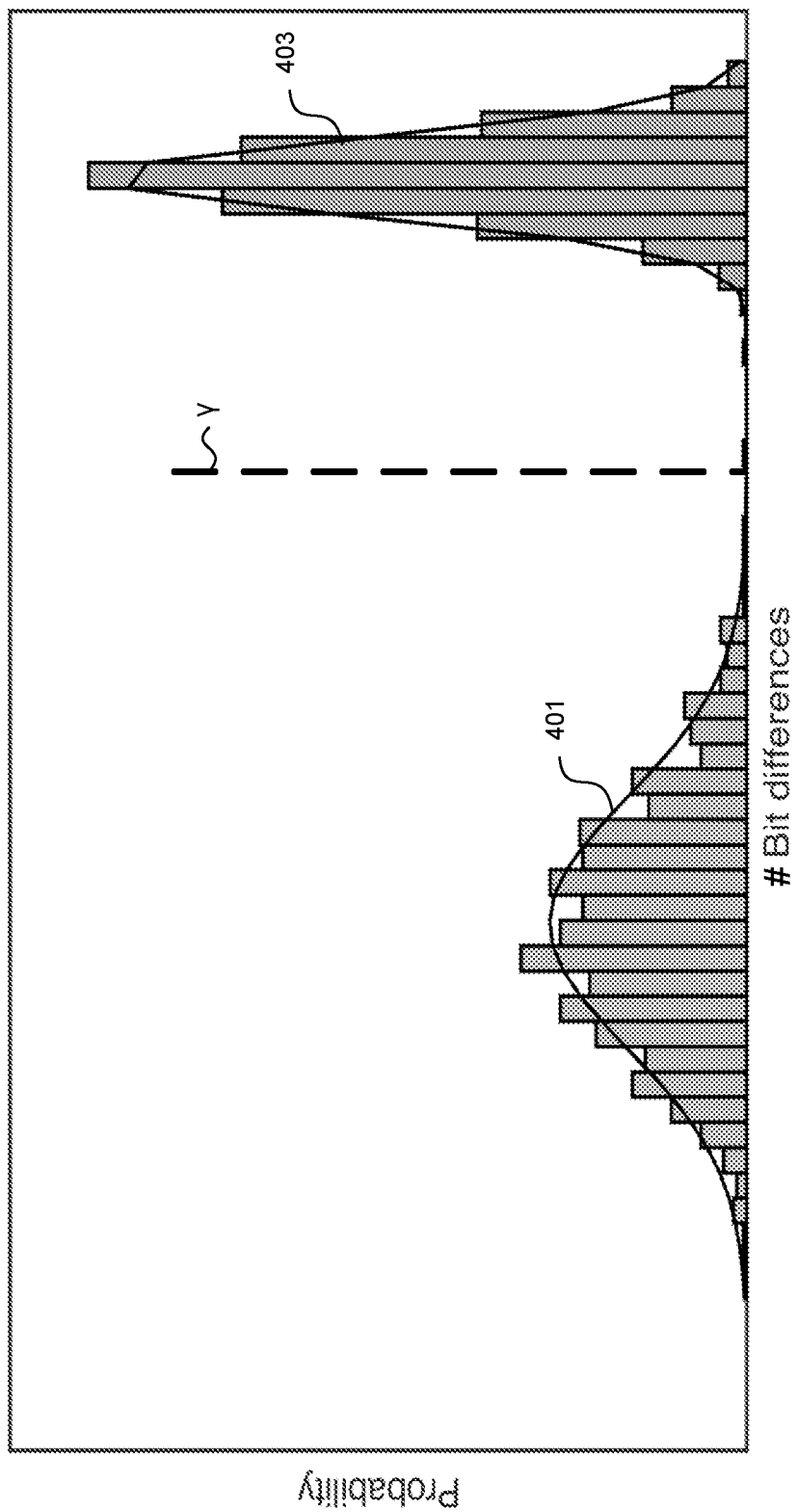
Figure 13B:
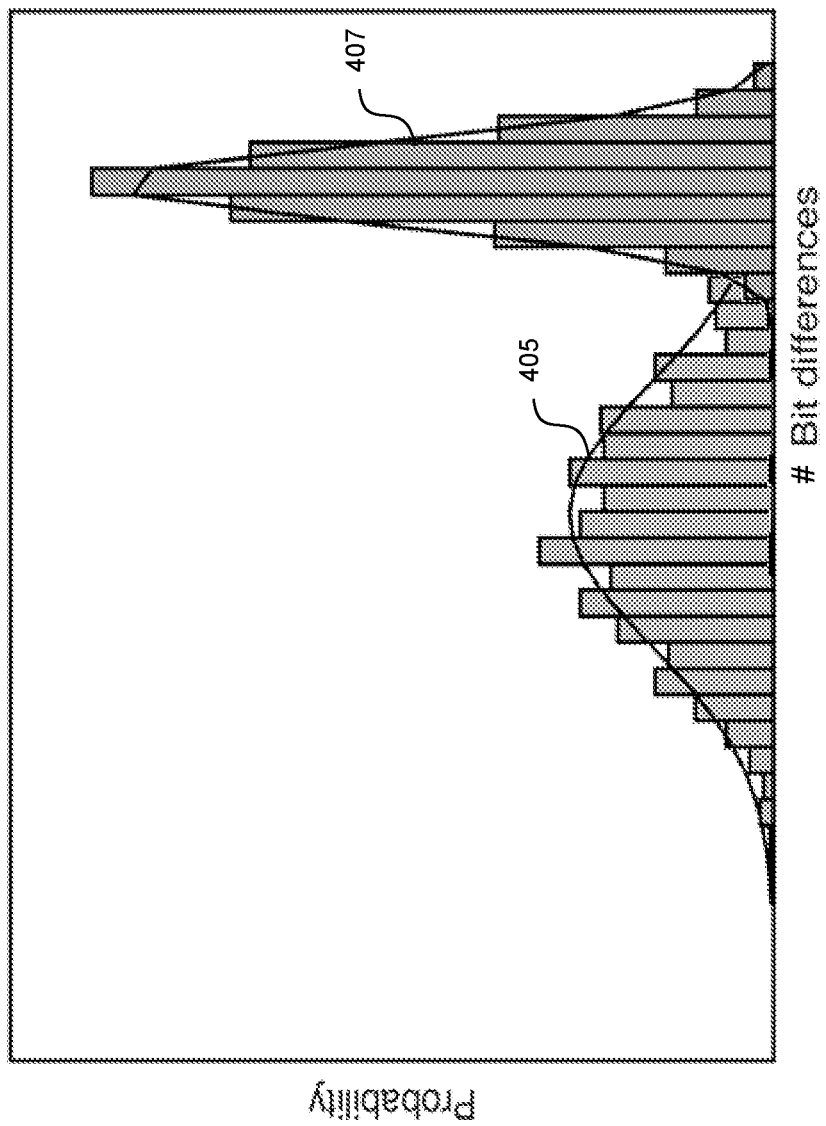

The process illustrated in FIG. 12a is carried out using the same filter (F(i)) on each of a number ($N_M$—for example 100) of matching pairs of audio clips; and the process illustrated in FIG. 12b is carried out using the same filter (F(i)) on each of a number ($N_N$—which may also be 100) of non-matching pairs of audio clips. If the $N_M$ values thus obtained for $B_M(i)$ and the $N_N$ values thus obtained for $B_N(i)$ are plotted in a histogram then they will each exhibit a Normal distribution that is characterised by a mean value and variance. If the current filter under consideration is a good filter candidate then the distribution for the matching pairs and the distribution for the non-matching pairs should be quite well separated from one another—such as the example distributions 401 and 403 shown in FIG. 13a. Distribution 401 is the distribution obtained for the matching pairs and distribution 403 is the distribution for the non-matching pairs. Whereas, if the filter under consideration is a poor candidate then the distribution for the matching pairs and the distribution for the non-matching pairs will be closer together and possibly overlapping—such as the example distributions 405 and 407 shown in FIG. 13b.

Unfortunately, it is not possible to just determine the distributions for all the 16,000 possible filters and then pick the ones that have the best discrimination (separation between the matching and non-matching distributions and smallest variances etc.)—as many of the filters will effectively be isolating the same characteristic feature in the audio signal. That is many of the distributions for the different filters will be highly correlated with one another. It is possible to identify these correlations by looking at the covariance between the filter distributions and to use this information in an optimisation process to find the optimum combination of filters. The aim of that optimisation can be to minimise the chance of "false positives" (falsely declaring a pair a "match") and to minimise the chance of false negatives (falsely declaring a pair a "non-match")—when the generated fingerprint is being matched against the database fingerprints. These are contradictory demands as in general reducing the chance of false positives increases the chance of false negatives. To address this, we can define a certain accepted rate of false positives ($P_{FP,accept}$) and then, subject to this constraint, we can find the optimal set of filters that minimises the false-negative rate.

To calculate $P_{FP,accept}$, note that the distribution resulting from a set of filters is the sum of normal distributions and therefore a normal distribution itself. Therefore, if the distributions for matching and non-matching pairs are well separated (like that shown in FIG. 13a), then a threshold ($\gamma$) can be defined between the two distributions that can be used to define if a pair of audio clips are matching or non-matching. In particular, for a given pair of audio clips, if the bit error rate between them is less than the threshold (i.e. B<$\gamma$) then it can be assumed that the pair is a matching pair; whereas if the determined bit error rate is above the threshold (i.e. B>$\gamma$) then it can be assumed that the pair is a non-matching pair.

The chance of a false positive is based on the chance of the bit error rate of a non-matching pair falling below the threshold ($\gamma$), which, for a normal distribution, is given by:

$$P(B_N < \gamma) = \frac{1}{2}\text{erfc}\left(\frac{\mu_N - \gamma}{\sqrt{2}\,\sigma_N}\right)$$

Where $\mu_N$ is the mean bit error rate for a pair of non-matching fingerprints, $\sigma_N$ is the standard deviation of the bit error rate for a pair of non-matching fingerprints and erfc is the standard complimentary error function.

When a fingerprint is being matched against a large database of fingerprints, the probability of a false positive depends on the size of the database (D) and can be approximated as:

$$P(\text{False positive}) \approx D \times P(B_N < \gamma) = \frac{D}{2}\text{erfc}\left(\frac{\mu_N - \gamma}{\sqrt{2}\,\sigma_N}\right) = P_{FP,accept}$$

which is set to the acceptance rate. This equation can be inverted to find the corresponding threshold value that will achieve this accepted rate of false positives:

$$\gamma = \mu_N - \sqrt{2}\,\sigma_N \text{erfc}^{-1}(2P_{FP,accept}/D)$$

Therefore, the false-negative rate can now be minimised (to thereby maximise the recognition rate), by minimising the chance of a false negative, given the threshold is set as above. The result is:

$$P(B_M > \gamma) =$$
$$\frac{1}{2}\text{erfc}\left(\frac{\gamma - \mu_M}{\sqrt{2}\,\sigma_M}\right) = \frac{1}{2}\text{erfc}\left(\frac{\mu_N - \mu_M}{\sqrt{2}\,\sigma_M} - \frac{\sigma_N}{\sigma_M}\text{erfc}^{-1}(2P_{FP,accept}/D)\right)$$

Where $\mu_M$ is the mean bit error rate for a pair of matching fingerprints, $\sigma_M$ is the standard deviation of the bit error rate for a pair of matching fingerprints, $\mu_N$ is the mean bit error rate for a pair of non-matching fingerprints, $\sigma_N$ is the standard deviation of the bit error rate for a pair of non-matching fingerprints and erfc is the standard complimentary error function.

Since the complimentary error function is a monotonically decreasing function, minimising the chance of a false negative, i.e. minimising the above function, is equivalent to maximising the argument of the complimentary error function, here called the first 'Score'; $S^{(1)}$:

$$S^{(1)} = \frac{\mu_N - \mu_M}{\sqrt{2}\,\sigma_M} - \frac{\sigma_N}{\sigma_M}\operatorname{erfc}^{-1}(2P_{FP,accept}/D)$$

Thus, the aim of the optimisation process is to find the set 45 of filters with aggregate parameters ($\mu_M$, $\mu_N$, $\sigma_M$, $\sigma_N$) that result in the highest score $S^{(1)}$.

These aggregate parameters over the set 45 of filters are related to the individual parameters of the individual filters in the set 45 as follows:

$$\mu_M = \frac{1}{n}\sum_{l=0}^{n-1}\mu_M(l) \text{ and } \mu_N = \frac{1}{n}\sum_{l=0}^{n-1}\mu_N(l)$$

Where n is the number of filters in the set 45. The aggregated variance (square of the standard deviation) becomes a combination of the variances of the individual filters belonging to the set 45 as well as the covariance between pairs of filters in the set 45, as follows:

$$\sigma_M^2 = \frac{1}{n^2}\sum_{l=0}^{n-1}(\sigma_M(l))^2 + \frac{1}{n^2}\sum_{l=0}^{n-1}\sum_{k=0,k\neq l}^{n-1}\operatorname{COV}_M^{(l,k)}$$

$$\sigma_N^2 = \frac{1}{n^2}\sum_{l=0}^{n-1}(\sigma_N(l))^2 + \frac{1}{n^2}\sum_{l=0}^{n-1}\sum_{k=0,k\neq l}^{n-1}\operatorname{COV}_N^{(l,k)}$$

Where $\operatorname{COV}^{(l,k)}$ is the covariance between filter l and filter k.

The means and variances for individual filters for both matching and non-matching pairs of audio clips can be determined from the training process discussed above with reference to FIGS. 12*a* and 12*b*. In particular, the mean bit error rate for the $N_M$ matching pairs of audio clips and the mean bit error rate for the $N_N$ non-matching pairs of audio clips for each filter (i) can be determined as follows:

$$\mu_M(i) = \frac{1}{N_M}\sum_{k=1}^{N_M}B_{M,k}(i) \text{ and } \mu_N(i) = \frac{1}{N_N}\sum_{k=1}^{N_N}B_{N,k}(i)$$

And the corresponding variances from:

$$(\sigma_M(i))^2 = \frac{1}{N_M-1}\sum_{k=1}^{N_M}(B_{M,k}(i)-\mu_M(i))^2 \text{ and } (\sigma_N^{(i)})^2 =$$

$$\frac{1}{N_N-1}\sum_{k=1}^{N_N}(B_{N,k}(i)-\mu_N(i))^2$$

Moreover, the covariance value ($\operatorname{COV}_M^{(i,j)}$) between two filters (i and j) for matching pairs of audio clips can be determined from:

$$\operatorname{COV}_M^{(i,j)} = \frac{1}{N_M-1}\sum_{k=1}^{N_M}(B_{M,k}(i)-\mu_M(i))(B_{M,k}(j)-\mu_M(j))$$

And the covariance value ($\operatorname{COV}_N^{(i,j)}$) between two filters (i and j) for non-matching pairs of audio clips can be determined from:

$$\operatorname{COV}_N^{(i,j)} = \frac{1}{N_N-1}\sum_{k=1}^{N_N}(B_{N,k}(i)-\mu_N(i))(B_{N,k}(j)-\mu_N(j))$$

This involves the calculation and storage of $N_f$ (the number of filters considered, which as discussed above is roughly 16,000) values of ($\mu_M(i)$, $\sigma_M(i)$); $N_f$ values of ($\mu_N(i)$, $\sigma_N(i)$); and (the dominant part) $2(N_f)^2$ covariance values. From these values it is then possible to calculate the above score $S^{(1)}$ for any combination of filters.

It is not practical to calculate this score for every single combination of n filters from this set of 16000 possible filters—the number of combinations prohibits this. However, it is possible to use a Dynamic Programming technique to break this problem down into an iterative path searching problem through a trellis of nodes that propagates and scores paths through the trellis of nodes. This means that the optimum path can be found through the trellis without having to consider and score all paths.

Figure 14:
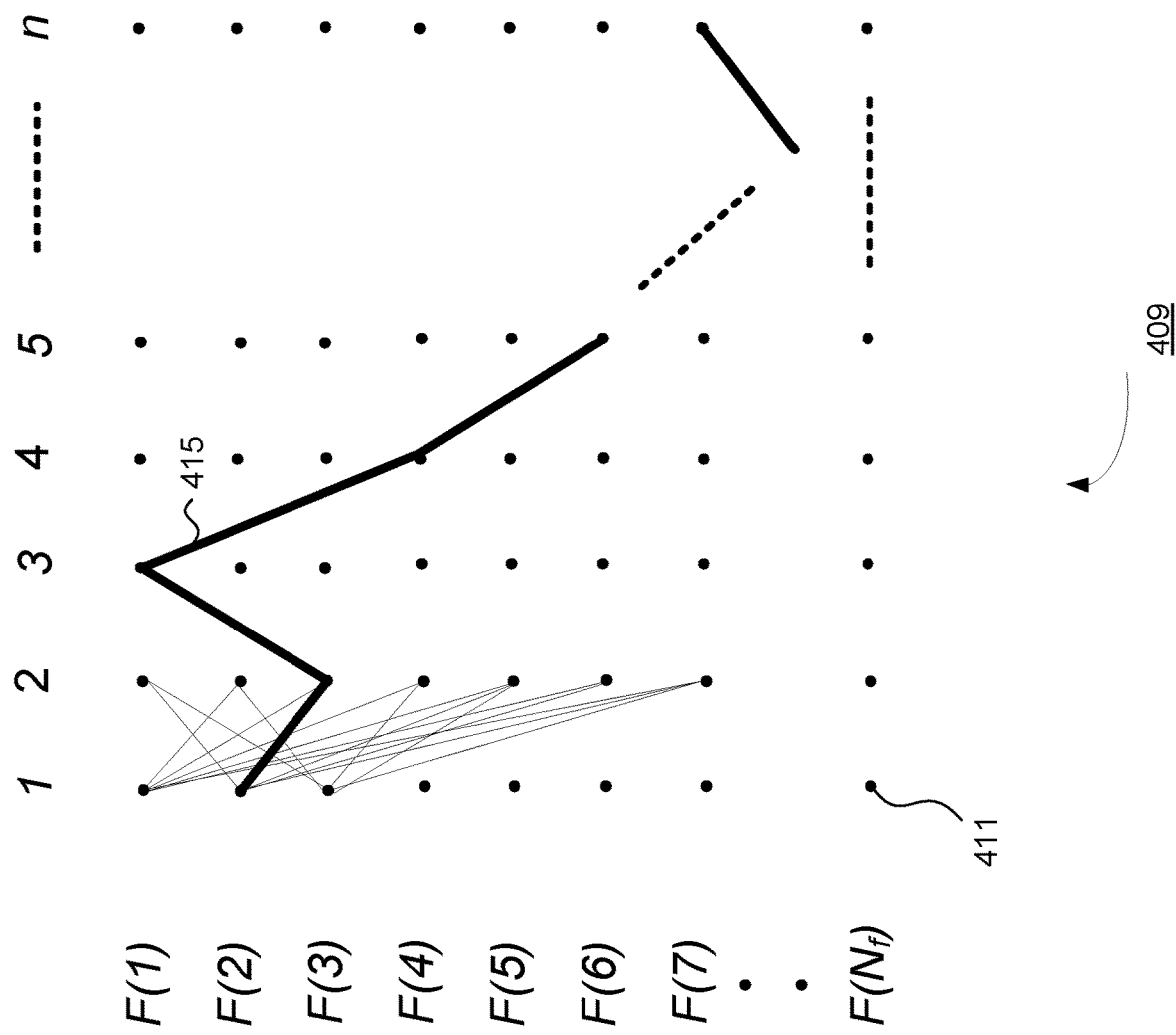

Such a trellis 409 is illustrated in FIG. 14. In particular, the $N_f$ filters are ordered vertically and represented by a respective node 411 in the left hand column of the trellis 409. This column of nodes 411 is then repeated n times so that there are n columns of nodes 411, where n is the size of the set of filters to be created. As discussed above, in this embodiment, n is set to the value 32 as this facilitates computation using a 32 bit or a 64 bit central processing unit (CPU). Connections (edges) from every node in the left hand column to every node in the next column are then made and scored using the above score ($S^{(1)}$) that is to be maximised. The same process is then repeated with connections being made from the second column to the third column and new scores calculated. Since the only allowed direction through the trellis is from left to right, the best scoring paths at any column can be used to determine the best scoring paths at the next column. This means that not all possible combinations of filters have to be considered, as the best solution can be built iteratively. Once this process has reached the right hand column, the path having the maximum score $S^{(1)}$ through the trellis 409 identifies the optimum set 45 of filters. For example, the path having the maximum score $S^{(1)}$ is illustrated as the path 415 shown in bold in FIG. 14. This path starts at the node corresponding to filter F(2), then traverses to the node corresponding to filter F(3) and then to F(1), F(4) and F(6); and finally ending at node F(7). These are the filters 47 that form the first optimised set 45 of filters used by the fingerprint generation unit 41.

One of the advantages of using a dynamic programming technique to find the best path through the trellis is that the scores for each path can be accumulated during the path traversal process. Specifically, considering the instance where a candidate path currently ends at node q at column number K in the trellis (i.e. K filters have been selected so far), which represents a set of filters l=1, 2, ... K. In this case, note that the aggregate means $\mu_M$ and $\mu_N$ can be updated toward node r at column K+1, by adding the means of node r, $\mu_M(r)$ and, $\mu_N(r)$, i.e.:

$$\mu_M^r = \frac{K\mu_M^q + \mu_M(r)}{K+1} \text{ and } \mu_M^r = \frac{K\mu_N^q + \mu_N(r)}{K+1}$$

where $\mu_M^q$ and $\mu_N^q$ are the aggregate means at node q, combining filters l=1, 2, ... K (i.e. at column K) and $\mu_M^T$ and $\mu_M^T$ are the aggregate means at node r. Similarly, variances $(\sigma_M)^2$ and $(\sigma_N)^2$ can be updated from column K to column K+1 as follows:

$$(\sigma_M^r)^2 = \frac{1}{(K+1)^2}\left(K^2(\sigma_M^q)^2 + (\sigma_M(r))^2 + \sum_{l=1}^{K} \text{COV}_M^{(l,r)}\right)$$

$$(\sigma_N^r)^2 = \frac{1}{(K+1)^2}\left(K^2(\sigma_N^q)^2 + (\sigma_N(r))^2 + \sum_{l=1}^{K} \text{COV}_N^{(l,r)}\right)$$

where the covariance of the added filter at node r with all previous filters in the path must be taken into account. The updated metrics can then be used to recalculated the score S at at node r.

As those skilled in the art will appreciate, the trellis 409 illustrated in FIG. 14 is a graphical representation that facilitates understanding of the dynamic programming calculations that will be made by the training computer (which may be a dedicated training computer or in some cases may be the audio matching server 5) during the above training process. The actual calculations will be performed with suitable data structures within the memory of the training computer. The resulting optimised set 45 of filters will then be provided to user devices 1 so that they can generate the fine fingerprints 43. They will also be used by the training computer (or by the audio matching server 5) to generate the fine database fingerprints 323.

Identifying the Second Optimised Set of Filters

As discussed above, in order that a meaningful coarse fingerprint 309 can be generated from the fine fingerprint 43, the rows (or columns) of the fine fingerprint 43 have to be ordered so that there is some level of coherence in the fine fingerprint—i.e. filters that tend to produce similar results are ordered next to each other. In this way, filters that are generally correlated with each other are next to each other. This results in a fine fingerprint 43 that is less random in appearance—i.e. having larger areas of the same binary value (as illustrated in by the fingerprint 43-2 shown in FIG. 6).

As discussed above, the covariance values that are determined for two filters gives information on the correlation between the two filters. Therefore, we can determine the order of the filters in dependence upon the covariance values calculated for the n filters in the optimised set 45 of filters. This can be achieved, for example, using a reverse Cuthill-Mckee ordering on the largest covariance values for the n filters. The determined ordering information is also provided to the user devices 1 with the first optimised set 45 of filters.

A similar training process can then be applied to determine the second set 221 of optimised filters. The main difference between this training process and the training process discussed above is that the filters are applied to fine fingerprints that are obtained for the matching and non-matching pairs of audio clips. Also, the optimisation process has a different goal.

Figure 15A:
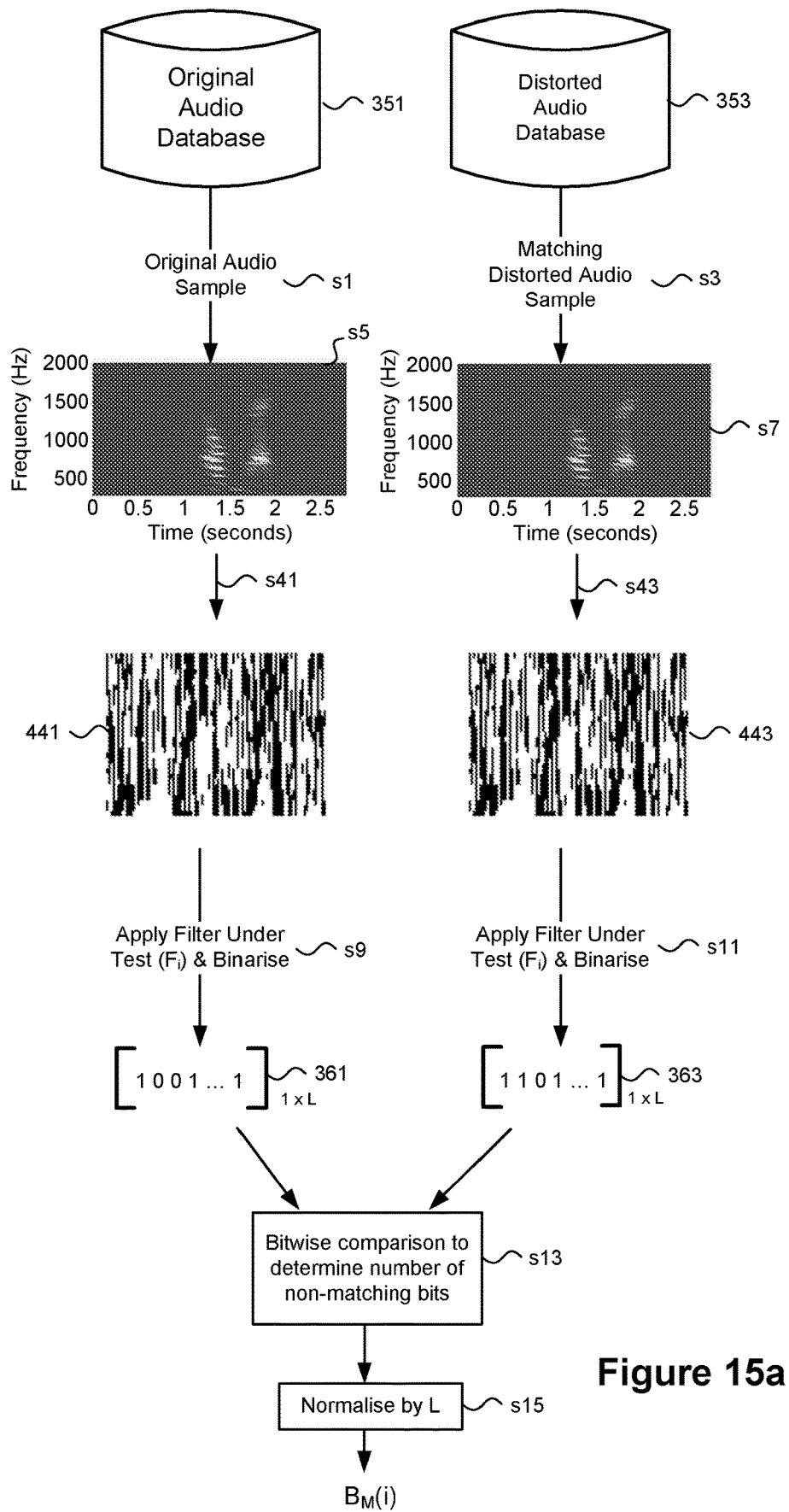
Figure 15B:
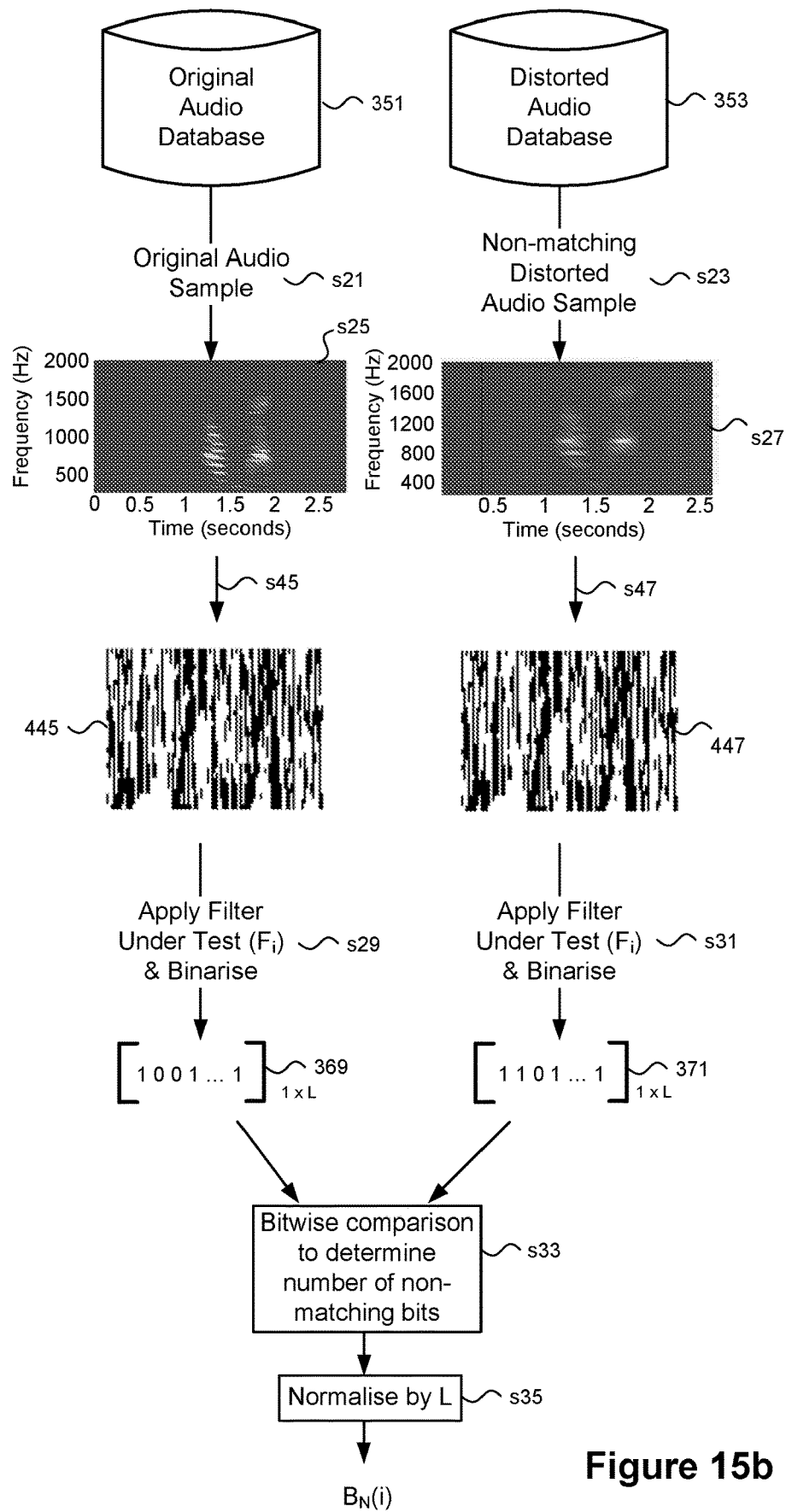

FIGS. 15a and 15b illustrate the processing performed to determine the $B^{(i)}{}_M$ values for matching pairs of audio clips and the $B^{(i)}{}_N$ values for non-matching pairs of audio clips. As can be seen by comparing FIG. 15 with FIG. 12, after the spectrograms have been calculated in steps s5, s7, s25 and s27, fine fingerprints 441, 443, 445 and 447 are determined in steps s41, s43, s45 and s47 respectively, using the above first set 45 of optimised filters and using the ordering information to define how the fine fingerprints are formed. The current filter under test (F(i)) is then applied to the fine fingerprints and the bitwise comparison is performed as before to determine $B_M(i)$ and $B_N(i)$.

The optimisation goal for determining the second set 221 of filters is to find the filters that will result in a minimum subset of possible matching database entries whilst not excluding the correct entry in the database 15—which will therefore reduce the number of comparisons required of the fine fingerprint 43. The database entries that must be searched in more detail (i.e. those for which a comparison between fine fingerprints will be performed) are those that fall below some second threshold $\gamma^{(2)}$ (which will be different from the $\gamma$ threshold used above). The expected number (N$_r$) of database entries below the threshold is given by:

$$N_r = DP(B_N^{(2)} < \gamma^{(2)}) = \frac{D}{2}\text{erfc}\left(\frac{\mu_N^{(2)} - \gamma^{(2)}}{\sqrt{2}\,\sigma_N^{(2)}}\right)$$

where all the parameters are representative of the coarse fingerprints and not the fine fingerprints—as signified by the superscript (2). To quantify N$_r$, the threshold $\gamma^{(2)}$ must be set. This threshold is set by defining an acceptable probability ($P_{accept}$) of a false negative (falsely classified a matching fingerprint as a non-matching fingerprint) from:

$$P(B_M^{(2)} > \gamma^{(2)}) = \frac{1}{2}\text{erfc}\left(\frac{\gamma^{(2)} - \mu_M^{(2)}}{\sigma_M^{(2)}\sqrt{2}}\right) = P_{accept}$$

This equation can be inverted to yield:

$$\gamma^{(2)} = \mu_M^{(2)} + \sigma_M^{(2)}\sqrt{2}\,\text{erfc}^{-1}(2P_{accept})$$

which provides the threshold $\gamma^{(2)}$ for a given acceptable false negative rate. Inserting this threshold into the equation for the expected number (N$_r$) of database entries below the threshold yields:

$$N_r = \frac{D}{2}\text{erfc}\left(\frac{\mu_N^{(2)} - \mu_M^{(2)}}{\sqrt{2}\,\sigma_N^{(2)}} - \frac{\sigma_M^{(2)}}{\sigma_N^{(2)}}\text{erfc}^{-1}(2P_{accept})\right)$$

In order to minimise this number, we need to find the combination of filters that will maximise the argument of this complimentary error function. Thus, the score to be maximised in this second optimisation process is given by:

$$S^{(2)} = \frac{\mu_N^{(2)} - \mu_M^{(2)}}{\sqrt{2}\,\sigma_N^{(2)}} - \frac{\sigma_M^{(2)}}{\sigma_N^{(2)}}\text{erfc}^{-1}(2P_{accept})$$

Again, the task is to find the combination of filters that maximises this score; where the aggregate mean and variances ($\mu^{(2)}_N$, $\mu^{(2)}_M$, $\sigma^{(2)}_N$ and $\sigma^{(2)}_M$) for any combination of filters can be calculated using the means, variances and covariances determined for each filter of the combination during the training process illustrated in FIG. 15. In other words these aggregate parameters are related to the individual parameters of the individual filters in the set as follows:

$$\mu^{(2)}_M = \frac{1}{n}\sum_{l=0}^{n-1} \mu^{(2)}_M(l) \text{ and } \mu^{(2)}_N = \frac{1}{n}\sum_{l=0}^{n-1} \mu^{(2)}_N(l)$$

Where n is the number of filters in the second set 221 of optimised filters. The aggregate variance (square of the standard deviation) becomes a combination of the variances of the individual filters belonging to the set 221 as well as the covariance between pairs of filters, as follows:

$$(\sigma^{(2)}_M)^2 = \frac{1}{n^2}\sum_{l=0}^{n-1}(\sigma^{(2)}_M(l))^2 + \frac{1}{n^2}\sum_{l=0}^{n-1}\sum_{k=0,k\neq l}^{n-1} \text{COV}_M^{(2)(l,k)}$$

$$(\sigma^{(2)}_N)^2 = \frac{1}{n^2}\sum_{l=0}^{n-1}(\sigma^{(2)}_N(l))^2 + \frac{1}{n^2}\sum_{l=0}^{n-1}\sum_{k=0,k\neq l}^{n-1} \text{COV}_N^{(2)(l,k)}$$

Where $\text{COV}^{(2)(l,k)}$ is the covariance between filter l and filter k.

The means, variances and covariances for individual filters for both matching and non-matching pairs of audio clips are determined from the training process discussed above with reference to FIGS. 15a and 15b. In particular, the mean bit error rate for the $N_M$ matching pairs of audio clips and the mean bit error rate for the $N_N$ non-matching pairs of audio clips for each filter (i) are determined as follows:

$$\mu^{(2)}_M(i) = \frac{1}{N_M}\sum_{k=1}^{N_M} B^{(2)}_{M,k}(i) \text{ and } \mu^{(2)}_N(i) = \frac{1}{N_N}\sum_{k=1}^{N_N} B^{(2)}_{N,k}(i)$$

And the corresponding variances from:

$$(\sigma^{(2)}_M(i))^2 = \frac{1}{N_M-1}\sum_{k=1}^{N_M}(B^{(2)}_{M,k}(i)-\mu^{(2)}_M(i))^2 \text{ and}$$

$$(\sigma^{(2)}_N(i))^2 = \frac{1}{N_N-1}\sum_{k=1}^{N_N}(B^{(2)}_{N,k}(i)-\mu^{(2)}_N(i))^2$$

Moreover, the covariance value ($\text{COV}_M^{(2)(i,j)}$) between two filters (i and j) for matching pairs of audio clips can be determined from:

$$\text{COV}_M^{(2)(i,j)} = \frac{1}{N_M-1}\sum_{k=1}^{N_M}(B^{(2)}_{M,k}(i)-\mu^{(2)}_M(i))(B^{(2)}_{M,k}(j)-\mu^{(2)}_M(j))$$

And the covariance value ($\text{COV}_N^{(2)(i,j)}$) between two filters (i and j) for non-matching pairs of audio clips can be determined from:

$$\text{COV}_N^{(2)(i,j)} = \frac{1}{N_N-1}\sum_{k=1}^{N_N}(B^{(2)}_{N,k}(i)-\mu^{(2)}_N(i))(B^{(2)}_{N,k}(j)-\mu^{(2)}_N(j))$$

As before, it is not practical to calculate the above score ($S^{(2)}$) for every possible combination of n filters from the set of 16,000 possible filters—the number of possible combinations is too large. However, as before, we can use Dynamic Programming to find the path having the maximum score ($S^{(2)}$) using the trellis 409 and the path propagation techniques discussed above. This dynamic programming procedure will identify the best path through the trellis 409—which in turn identifies the best combination of filters to form the second set 221 of optimised filters that are used by the audio matching server 5 to generate the coarse fingerprints from fine fingerprints.

As before, the path scoring can be accumulated during the dynamic programming path propagation to find the best path through the trellis—so it is not necessary to recalculate the score $S^{(2)}$ each time a new node (filter) is added to a candidate path. Instead the score is updated using the individual statistics for the filter associated with the new node r, column K+1, when coming from node q at column number K as before:

$$\mu^{r(2)}_M = \frac{K\mu^{q(2)}_M + \mu^{(2)}_M(r)}{K+1} \text{ and } \mu^{r(2)}_M = \frac{K\mu^{q(2)}_N + \mu^{(2)}_N(r)}{K+1}$$

where $\mu_M^{q(2)}$ and $\mu_N^{q(2)}$ are the aggregate means at node q and $\mu_M^{r(2)}$ and $\mu_M^{r(2)}$ are the aggregate means at node r. Similarly, variances $(\theta_M^{(2)})^2$ and $(\sigma_N^{(2)})^2$ can be updated from column K to column K+1 as follows:

$$(\sigma^{r(2)}_M)^2 = \frac{1}{(K+1)^2}\left(K^2(\sigma^{q(2)}_M)^2 + (\sigma^{(2)}_M(r))^2 + \sum_{l=1}^{K}\text{COV}_M^{(2)(l,r)}\right)$$

$$(\sigma^{r(2)}_N)^2 = \frac{1}{(K+1)^2}\left(K^2(\sigma^{q(2)}_N)^2 + (\sigma^{(2)}_N(r))^2 + \sum_{l=1}^{K}\text{COV}_N^{(2)(l,r)}\right)$$

The updated metrics can then be used to recalculated the score $S^{(2)}$ at node r.

MODIFICATIONS AND FURTHER EMBODIMENTS

An embodiment has been described above illustrating the way in which fingerprints may be created for the identification of an audio signal in an audio database. As those skilled in the art will appreciate various modifications and improvements can be made to the above embodiment and some of these modifications will now be described.

In the above embodiment, the user device generated a fine fingerprint which it transmitted to the audio matching server which generated a coarse fingerprint from the fine fingerprint. In another embodiment, the user device itself may calculate the coarse fingerprint and send it together with the fine fingerprint to the audio matching server.

In the above embodiments, a coarse fingerprint was generated from the fine fingerprint. This is particularly beneficial in the scenario where a user device determines the fine fingerprint and sends it to a remote server for comparison with the database entries. In other embodiments where the user device calculates both the coarse fingerprint and the fine fingerprint, the coarse fingerprint can be determined from the spectrogram of the captured audio rather than from the fine fingerprint. In this case, the second set 221 of optimised filters would be trained using the second score described above—but based on binarised vectors obtained by applying the filters to the spectrogram rather than to the fine fingerprint. This would also be the case if the user device transmitted the fine fingerprint and the spectrogram to the remote server—which then calculated the coarse fingerprint from the received spectrogram. However, this latter possibility is not preferred as it requires the spectrogram (which is a large data structure) to be transmitted from the user device to the server.

In the above embodiments, the user device or the audio matching server generated a coarse fingerprint from a fine fingerprint using a set of optimised filters that are applied to the fine fingerprint. In a simpler embodiment, the coarse fingerprint could be generated simply by sub-sampling the fine fingerprint or by averaging the fine fingerprint. However, it is preferred to apply the above described second set of optimised filters to the fine fingerprint as it has been found that the resulting coarse fingerprint is better at minimising the number of database entries that are found to be possibly matching whilst minimising false positives and false negatives.

In embodiments where the size of the database is relatively small, the audio matching server and the database may form part of the user device itself. In this case, there is no need for the user device to transmit any fingerprint data over the telecommunications network or over the computer network. This data would simply be sent between the different software components being run in the user device (although any results of the matching may be transmitted over the network to a server).

FIGS. 12 and 15 illustrate two databases—one for original audio samples and the other for distorted versions of the audio samples. As those skilled in the art will appreciate, all these audio samples may just be stored in a single database rather than in two separate databases. Similarly, these figures illustrate that spectrograms are determined for each audio sample in a matched pair and for each audio sample in a non-matched pair. As those skilled in the art will appreciate, the same audio samples may be included in a pair of matched audio samples and in a pair of non-matching audio samples. In this case it is clearly not necessary to determine the spectrogram for the same audio sample twice. That is, the optimisation process only needs to determine the spectrogram for each audio sample in the database and then apply each filter to each spectrogram.

In the above embodiments, the optimisation process set an acceptable false positive rate and then found the set of filters that minimised the false negative rate. In another embodiment, the optimisation process may set an acceptable false negative rate and then find the set of filters that minimises the false positive rate. In a further embodiment the optimisation process may set an acceptable false positive rate and an acceptable false negative rate and then find the set of filters that minimises some other cost function.

In the above embodiment, the dynamic programming processes selected the path through the trellis 409 having the highest score. As those skilled in the art will appreciate, the best or optimum path that is chosen does not have to be the one having the highest score—for example the path having the second highest or the third highest score could be used instead.

In the above embodiment, a user device captured sounds using a microphone and the audio samples were processed using a software application stored on the user device. As those skilled in the art will appreciate, some or all of this processing may be formed by dedicated hardware circuits, although software is preferred due to its ability to be added to the portable user device after manufacture and its ability to be updated once loaded. The software for causing the portable user device to operate in the above manner may be provided as a signal or on a carrier such as compact disc or other carrier medium. Additionally, a range of other portable devices may be used, such as laptop computers, PDAs, tablet computers and the like. Similarly, the software forming part of the audio matching server may be replaced with suitable hardware circuits—such as Application Specific Integrated Circuits.

The above embodiments have described a fingerprint based audio matching system. This system may also be used together with a watermarking type of audio matching system that detects hidden watermarks that have been hidden in the audio. In particular, if no watermark can be found in some captured audio, then the above fingerprint audio recognition can be used to identify the captured audio.

In the above embodiments, the sets of optimised filters used five different types of filter. In other embodiments more or fewer types of filter may be used. Further it is not essential to use filters that are rectangular in shape—other irregular shapes of filters could be used (such as "L" shaped filters). The shape of filter just defines the neighbouring values in the spectrogram (or in the fine fingerprint) that are weighted by the corresponding coefficient in the filter and then combined together.

In the above embodiment, when generating the fine fingerprint, each filter of the first set of optimised filters was stepped along the spectrogram one time step at a time. This meant that the fine fingerprint had the same temporal dimension as the original spectrogram. As those skilled in the art will appreciate, the fine fingerprint could omit some of these data points—at the start or end of the spectrogram. Also, a larger step size could also be used—for example one time point could be skipped at each step. In this case the fine fingerprint would have a temporal duration half that of the spectrogram. So if the spectrogram had 500 time points then the generated fine fingerprint would have 250 time points.

In the embodiment described above, the coarse fingerprint was generated with a time resolution $1/10^{th}$ that of the spectrogram. That is 10 time points were skipped between steps when the second set of optimised filters were stepped across the spectrogram. As those skilled in the art will appreciate, other step sizes could of course be used to achieve different compression of the data in the time dimension.

In the above embodiments, the audio signal captured by the user device was an acoustic signal. In other embodiments, the user device may capture the audio signal as an electromagnetic signal received via the antenna of the user device; or in the case that the user device is not a portable device and is, for example, a personal computer or a set-top-box or a smart television, the audio signal may be captured via a signal received over a broadcast television network (e.g. a satellite network, a cable network, an ADSL network or the like), the Internet or some other computer network.

In the above embodiments each entry in the database contained a coarse fingerprint and a fine fingerprint. In another embodiment, each database entry may not contain the coarse fingerprint—which may instead be generated when needed from the fine database fingerprint. The coarse database fingerprint may be generated from the fine database fingerprint in a number of different ways—just as the coarse query fingerprint can be determined in a number of different ways from the fine query fingerprint. These different ways of determining the coarse fingerprint from the fine fingerprint are discussed above and will not be repeated again. Needless to say, the technique used to generate the coarse query fingerprint should be the same as the technique that is used to generate the coarse database fingerprint.

The invention claimed is:

1. A computer implemented method comprising:
   i) providing, by a computer, one or more databases comprising a plurality of audio samples including NM matched pairs of audio samples and NN non-matched pairs of audio samples, each matched pair of audio samples comprising an original audio sample and a distorted version of a same original audio signal and each non-matched pair of audio samples comprising an original audio sample and a version of a different original audio signal, wherein the NM is a number of matched pairs of audio samples and the NN is a number of non-matched pairs of audio samples;
   ii) determining, by the computer, a spectrogram for each audio sample of the plurality of audio samples in the one or more databases and storing the spectrograms in a memory;
   iii) applying, by the computer, each filter of Nf candidate filters to the spectrograms stored in the memory and binarising a result to generate a plurality of vectors of binary bits, each vector of the binary bits being associated with one candidate filter and one audio sample, wherein the Nf is number of candidate filters;
   iv) comparing, by the computer, the binary bits in the vectors associated with a selected matched pair of audio samples for a current filter to determine bit error rate information for the current filter and the selected matched pair of audio samples;
   v) repeating, by the computer, step iv) for each matched pair of audio samples to determine average and variance information for the bit error rate information determined in step iv) for the current filter and the matched pairs of audio samples;
   vi) comparing, by the computer, the binary bits in the vectors associated with a selected non-matched pair of audio samples for the current filter to determine bit error rate information for the current filter and the selected non-matched pair of audio samples;
   vii) repeating, by the computer, step vi) for each non-matched pair of audio samples to determine average and variance information for the bit error rate information determined in step vi) for the current filter and the non-matched pairs of audio samples;
   viii) repeating, by the computer steps iv) to vii) for each candidate filter to determine average and variance information for each candidate filter for the matched pairs of audio samples and to determine average and variance information for each candidate filter for the non-matched pairs of audio samples;
   ix) determining, by the computer, a subset of said candidate filters as optimised set of filters using the determined average and variance information for each candidate filter for the matched pairs of audio samples and the determined average and variance information for each candidate filter for the non-matched pairs of audio samples; and
   x) providing, by the computer, the optimised set of filters to an audio matching system to allow the audio matching system to generate an acoustic fingerprint of an audio sample using the optimised set of filters.

2. The method according to claim 1, wherein determining the optimised set of filters uses the determined average and variance information for each candidate filter for the matched pairs of audio samples and the determined average and variance information for each candidate filter for the non-matched pairs of audio samples to minimize chance of false positives or to minimize chance of false negatives or a combination of minimizing the chance of false positives and minimizing the chance of false negatives.

3. The method according to claim 1, further comprising determining covariance information for each par of filters of a plurality of pairs of filters using determined average and variance information; and determining said optimised set of filters uses the determined average and variance information and the covariance information.

4. The method according to claim 1, wherein determining the optimised set of filters includes using a dynamic programming optimisation technique to identify the optimised set of filters.

5. An apparatus comprising:
   one or more databases comprising a plurality of audio samples including NM matched pairs of audio samples and NN non-matched pairs of audio samples, each matched pair of audio samples comprising an original audio sample and a distorted version of a same original audio signal and each non-matched pair of audio samples comprising an original audio sample and a version of a different original audio signal, wherein the NM is a number of matched pairs of audio samples and the NN is a number of non-matched pairs of audio samples; and
   one or more processors configured to:
   i) determine a spectrogram for each audio sample of said plurality of audio samples in the one or more databases and storing each spectrogram for each audio sample of said plurality of audio samples in a memory;
   ii) apply each filter of Nf candidate filters to the spectrograms stored in said memory and binarising a result to generate a plurality of vectors of binary bits, each vector of the binary bits being associated with one candidate filter and one audio sample, wherein the IV is number of candidate filters;
   iii) compare the binary bits in the vectors associated with a selected matched pair of audio samples for a current filter to determine bit error rate information for the current filter and the selected matched pair of audio samples;
   iv) repeat iii) for each matched pair of audio samples to determine average and variance information for the bit error rate information determined in step iii) for the current filter and the matched pairs of audio samples;
   v) compare the binary bits in the vectors associated with a selected non-matched pair of audio samples for the current filter to determine bit error rate information for the current filter and the selected non-matched pair of audio samples;
   vi) repeat v) for each non-matched pair of audio samples to determine average and variance information for the bit error rate information determined in v) for the current filter and the non-matching pairs of audio samples;

vii) repeat iii) to vi) for each candidate filter to determine average and variance information for each candidate filter for the matched pairs of audio samples and to determine average and variance information for each candidate filter for the non-matched pairs of audio samples;

viii) determine a subset of said candidate filters as optimised set of filters using the determined average and variance information for each candidate filter for the matched pairs of audio samples and the determined average and variance information for each candidate filter for the non-matched pairs of audio samples; and ix) provide the optimised set of filters to an audio matching system to allow the audio matching system to generate an acoustic fingerprint of an audio sample using the optimised set of filters.

6. A user device for use in an audio matching system, the user device comprising:

an input for capturing an audio signal;

one or more processors configured to:

process the captured audio signal to generate a query acoustic fingerprint representative of the captured audio signal using a set of optimised filters;

output the query acoustic fingerprint to an audio matching server; and receive a matching response comprising information relating to the captured audio; and wherein said set of optimized filters is determined using a method of:

i) providing one or more databases comprising a plurality of audio samples including the NM matched pairs of audio samples and NN non-matched pairs of audio samples, each matched pair of audio samples comprising an original audio sample and a distorted version of a same original audio signal and each non-matched pair of audio samples comprising an original audio sample and a version of a different original audio signal, wherein the NM is a number of matched pairs of audio samples and the NN is a number of non-matched pairs of audio samples;

ii) determining a spectrogram for each audio sample of the plurality of audio samples in the one or more databases and storing the spectrograms in a memory;

iii) applying each filter of Nf candidate filters to the spectrograms stored in the memory and binarising a result to generate a plurality of vectors of binary bits, each vector of the binary bits being associated with one candidate filter and one audio sample, wherein the Nf is a number of candidate filters;

iv) comparing the binary bits in the vectors associated with a selected matched pair of audio samples for a current filter to determine bit error rate information for the current filter and the selected matched pair of audio samples;

v) repeating step iv) for each matched pair of audio samples to determine average and variance information for the bit error rate information determined in step iv) for the current filter and the matched pairs of audio samples;

vi) comparing the binary bits in the vectors associated with a selected non-matched pair of audio samples for the current filter to determine bit error rate information for the current filter and the selected non-matched pair of audio samples;

vii) repeating step vi) for each non-matched pair of audio samples to determine average and variance information for the bit error rate information determined in step vi) for the current filter and the non-matched pairs of audio samples;

viii) repeating steps iv) to vii) for each candidate filter to determine average and variance information for each candidate filter for the matched pairs of audio samples and to determine average and variance information for each candidate filter for the non-matched pairs of audio samples;

ix) determining a subset of said candidate filters as optimised set of filters using the determined average and variance information for each candidate filter for the matched pairs of audio samples and the determined average and variance information for each candidate filter for the non-matched pairs of audio samples;

x) providing the optimised set of filters to the audio matching system to allow the audio matching system to generate an acoustic fingerprint of an audio sample using the optimised set of filters.

* * * * *